(12) United States Patent
Getschmann et al.

(10) Patent No.: US 11,838,286 B2
(45) Date of Patent: *Dec. 5, 2023

(54) MULTI-STAGE SECURE NETWORK ELEMENT CERTIFICATE PROVISIONING IN A DISTRIBUTED MOBILE ACCESS NETWORK

(71) Applicant: Parallel Wireless, Inc., Nashua, NH (US)

(72) Inventors: Robert Getschmann, Exeter, NH (US); Ketan Supanekar, Nashua, NH (US); David Ruffen, Salem, NH (US)

(73) Assignee: Parallel Wireless, Inc., Nashua, NH (US)

( * ) Notice: Subject to any disclaimer, the term of this patent is extended or adjusted under 35 U.S.C. 154(b) by 109 days.

This patent is subject to a terminal disclaimer.

(21) Appl. No.: 17/123,093

(22) Filed: Dec. 15, 2020

(65) Prior Publication Data

US 2021/0105266 A1    Apr. 8, 2021

Related U.S. Application Data

(63) Continuation of application No. 15/872,889, filed on Jan. 16, 2018, now Pat. No. 10,868,803.

(Continued)

(51) Int. Cl.
*H04L 9/40*     (2022.01)
*H04W 76/12*   (2018.01)
(Continued)

(52) U.S. Cl.
CPC ...... *H04L 63/0823* (2013.01); *H04L 63/0428* (2013.01); *H04L 63/0876* (2013.01);
(Continued)

(58) Field of Classification Search
CPC ............. H04L 63/0823; H04L 63/0428; H04L 63/0876; H04L 63/0272; H04L 63/164;
(Continued)

(56) References Cited

U.S. PATENT DOCUMENTS 8,391,264 B1 *  3/2013  Breau ............... H04W 36/0069
                                                        455/448
2012/0011574 A1   1/2012  Holtmanns et al.
(Continued)

*Primary Examiner* — Abiy Getachew
(74) *Attorney, Agent, or Firm* — Michael Y. Saji

(57) ABSTRACT

A method is disclosed, comprising: configuring, based on hardware characteristics of a radio access device, a first security certificate; setting up a first encrypted tunnel with a first security server using the first security certificate, the first security server configured to grant permission via the first security certificate for obtaining a second security certificate providing access to an operator core network; tearing down the first encrypted tunnel; and setting up a second encrypted tunnel to a second security server within the operator core network using the second security certificate, the second encrypted tunnel configured to allow the radio access device to securely communicate with the operator core network for providing connectivity for user devices to the operator core network, wherein the first encrypted tunnel and the second encrypted tunnel to use a single transport port to obtain the second security certificate via the first encrypted tunnel.

21 Claims, 12 Drawing Sheets

Related U.S. Application Data

(60) Provisional application No. 62/446,158, filed on Jan. 13, 2017.

(51) Int. Cl.
| | |
|---|---|
| *H04W 12/03* | (2021.01) |
| *H04W 12/041* | (2021.01) |
| *H04W 12/043* | (2021.01) |
| *H04W 12/069* | (2021.01) |
| *H04W 12/0471* | (2021.01) |
| *H04W 12/79* | (2021.01) |

(52) U.S. Cl.
CPC ......... *H04W 12/03* (2021.01); *H04W 12/041* (2021.01); *H04W 12/043* (2021.01); *H04W 12/0471* (2021.01); *H04W 12/069* (2021.01); *H04W 76/12* (2018.02); *H04L 63/0272* (2013.01); *H04L 63/164* (2013.01); *H04W 12/79* (2021.01)

(58) Field of Classification Search
CPC . H04W 12/03; H04W 12/041; H04W 12/043; H04W 12/0471; H04W 12/069; H04W 76/12; H04W 12/79
See application file for complete search history.

(56) References Cited

U.S. PATENT DOCUMENTS

| | | | |
|---|---|---|---|
| 2013/0074142 A1* | 3/2013 | Brennan | G06F 21/6245 726/1 |
| 2017/0187733 A1* | 6/2017 | Ahn | H04L 61/4511 |

* cited by examiner

MULTI-STAGE SECURE NETWORK ELEMENT CERTIFICATE PROVISIONING IN A DISTRIBUTED MOBILE ACCESS NETWORK

CROSS-REFERENCE TO RELATED APPLICATIONS

This application is a continuation under 35 U.S.C. § 120 of U.S. patent application Ser. No. 15/872,889, filed Jan. 16, 2018, and entitled "MULTI-STAGE SECURE NETWORK ELEMENT CERTIFICATE PROVISIONING IN A DISTRIBUTED MOBILE ACCESS NETWORK," which itself claims priority under 35 U.S.C. § 119(e) to U.S. Provisional Pat. App. No. 62/446,158, titled "Multi-Stage Secure Network Element Certificate Provisioning in a Distributed Mobile Access Network" and filed on Jan. 13, 2017, each of which is also hereby incorporated by reference in its entirety for all purposes. This application also hereby incorporates by reference in their entirety for all purposes each of U.S. Pat. No. 9,455,959, entitled "Method of connecting security gateway to mesh network," filed May 29, 2014; U.S. Pat. App. Pub. No. 2014/0086120 A1, entitled "Heterogeneous Mesh Network and a Multi-RAT Node Used Therein," filed May 8, 2013; U.S. Pat. App. Pub. No. 2014/0092765 A1, entitled "Heterogeneous Self-Organizing Network for Access and Backhaul," filed Sep. 12, 2013; U.S. Pat. App. Pub. No. 2014/0133456 A1, entitled "Dynamic Multi-Access Wireless Network Virtualization," filed Sep. 24, 2013; U.S. Pat. App. Pub. No. 2014/0233412 A1, entitled "Methods of Incorporating an Ad Hoc Cellular Network Into a Fixed Cellular Network," filed Feb. 18, 2014; U.S. Pat. App. Pub. No. 2015/0045063 A1, entitled "Multi-RAT Node Used for Search and Rescue," filed Aug. 7, 2014; U.S. Pat. App. Pub. No. 2015/0078167 A1, entitled "System and Methods for Providing LTE-Based Backhaul," filed Aug. 6, 2014; U.S. Pat. App. Pub. No. 2015/0173111 A1, entitled "Virtualization of the Evolved Packet Core to Create a Local EPC," filed Dec. 15, 2014; U.S. Pat. App. Pub. No. 2015/0257051 A1, entitled "Federated X2 Gateway," filed Mar. 9, 2015; U.S. Pat. App. Pub. No. 2016/0135132 A1, entitled "Self-Calibrating and Self-Adjusting Network," filed Nov. 9, 2015. This application also hereby incorporates by reference in their entirety for all purposes 3GPP TS 33.310 entitled "Network Domain Security (NDS); Authentication Framework (AF)," IETF RFC 4301 entitled "Security Architecture for the Internet Protocol," RFC 4303 "IP Encapsulating Security Payload," and RFC 7296 entitled "Internet Key Exchange Protocol Version 2 (IKEv2)."

BACKGROUND

The Third Generation Partnership Project (3GPP) Technical Specification (TS) 33.310 entitled "Network Domain Security (NDS); Authentication Frameworks (AF)" defines functionality for certificate enrollment for base stations. In order for a Long Term Evolution (LTE) E-UTRAN Node B or Evolved Node B (eNodeB) element to obtain connectivity to an operator's network over an unsecured network, a secure encrypted conduit provided by IPsec is required between the eNodeB and the security gateway (SeGW). Mutual authentication of each peer by the other may be obtained via the use of X.509 Digital Certificates.

Within an LTE Mobile Network, an eNodeB is typically provisioned with a Factory Signed Digital Certificate. The eNodeB element utilizes the said Digital Certificate to authenticate itself with the operator's Registration Authority (RA)/Certificate Authority (CA) elements. Upon successful authentication, the eNodeB obtains an operator signed certificate from the RA/CA utilizing the Certificate Management Protocol (CMPv2). CMP is a protocol for managing Public Key Infrastructures (PKI) based on X.509v3 certificates and defines messages for certificate creation and management. CMP protocol messages may be carried over using OpenSSL, TCP-messaging protocol on top of TCP, HTTP, TCP-messaging over HTTP, FTP, SMTP, POP, etc., and therefore require many different kinds of ports to be opened, when the base station is being connected to multiple mobile packet core networks. Enabling ports for CMP for obtaining operational certificate therefore increases the security risks to the network.

SUMMARY

Systems and methods for a multi-stage secure network element certificate provisioning in a distributed mobile access network are disclosed.

In a first embodiment, a method is disclosed, comprising: configuring based on hardware characteristics of a radio access device, a first security certificate; setting up a first encrypted tunnel with a first security server using the first security certificate, the first security server configured to grant permission via the first security certificate for obtaining a second security certificate providing access to an operator core network' tearing down the first encrypted tunnel; and setting up a second encrypted tunnel to a second security server within the operator core network using the second security certificate, the second encrypted tunnel configured to allow the radio access device to securely communicate with the operator core network for providing connectivity for user devices to the operator core network, thereby enabling the radio access device to obtain the second security certificate via the first encrypted tunnel. The first encrypted tunnel and the second encrypted tunnel may use a single transport port.

The method may further comprise configuring the first security certificate not based on characteristics of a telecom operator network. The method may further comprise setting up the first encrypted tunnel when the radio access device may be booted from a factory-configured default state. The hardware characteristics of the radio access device may include a hardware identifier of a radio interface in the radio access device. The first security server may be configured to permit communications over Transmission Control Protocol (TCP) port number 4500. The first encrypted tunnel and the second encrypted tunnel may be encrypted using an IPsec protocol. The first security server and the second security server may be certificate authorities in a public key infrastructure (PKI).

The first security certificate may be configured to limit traffic using IPsec traffic selectors. The radio access device may be a small cell, femto cell, macro cell, wireless access point, or wireless access gateway. The first security certificate may be a factory-installed certificate, and the second security certificate may be an operational certificate containing security information specific to the operator core network, the security information may not be present on the radio access device prior to issuance of the second security certificate.

The method may further comprise proxying, at a gateway situated between the radio access device and the operator core network public key infrastructure (PKI) communications between the radio access device and the operator core network. The method may further comprise requesting, at a gateway situated between the radio access device and the operator core network, the second security certificate on behalf of the radio access device.

The method may further comprise managing, at a gateway situated between the radio access device and the operator core network, security certificates for a plurality of radio access devices. The first security server may be a gateway situated between the radio access device and the operator core network.

The radio access device may be a virtualized radio access device in a radio access network. The first encrypted tunnel and the second encrypted tunnel may transport certificate management protocol messages. The method may further comprise sending provisioning configuration for the radio access device through the first encrypted tunnel from the first security server to the radio access device.

In a second embodiment, a non-transitory computer-readable medium containing instructions which, when executed on a processor, perform steps is disclosed comprising: configuring, based on hardware characteristics of a radio access device, a first security certificate; setting up a first encrypted tunnel with a first security server using the first security certificate, the first security server configured to grant permission via the first security certificate for obtaining a second security certificate providing access to an operator core network; tearing down the first encrypted tunnel; and setting up a second encrypted tunnel to a second security server within the operator core network using the second security certificate, the second encrypted tunnel configured to allow the radio access device to securely communicate with the operator core network for providing connectivity for user devices to the operator core network, thereby enabling the radio access device to obtain the second security certificate via the first encrypted tunnel.

The steps may further comprise configuring the first security certificate not based on characteristics of a telecom operator network. The steps may further comprise setting up the first encrypted tunnel when the radio access device may be booted from a factory-configured default state. The hardware characteristics of the radio access device may include a hardware identifier of a radio interface in the radio access device. The first security server may be configured to permit communications over Transmission Control Protocol (TCP) port number 4500. The first encrypted tunnel and the second encrypted tunnel may be encrypted using an IPsec protocol.

The first security server and the second security server may be certificate authorities in a public key infrastructure (PKI). The first security certificate may be configured to limit traffic using IPsec traffic selectors. The radio access device may be a small cell, femto cell, macro cell, wireless access point, or wireless access gateway. The first security certificate may be a factory-installed certificate, and the second security certificate may be an operational certificate containing security information specific to the operator core network. The security information not present on the radio access device prior to issuance of the second security certificate.

In a third embodiment, a method is disclosed comprising: receiving, at a security gateway situated between a radio access device and an operator core network, a first request for a first encrypted tunnel using a first certificate from a radio access device; validating the first certificate using identifying information of the radio access device in the first certificate; granting permission, at the security gateway, for the radio access device to obtain a second security certificate providing access to the operator core network; requesting, at the security gateway, on behalf of the radio access device, the second security certificate from a second security gateway in the operator core network; sending, at the security gateway, the second security certificate to the radio access device using the first encrypted tunnel; and tearing down the first encrypted tunnel.

DETAILED DESCRIPTION

Figure 1:
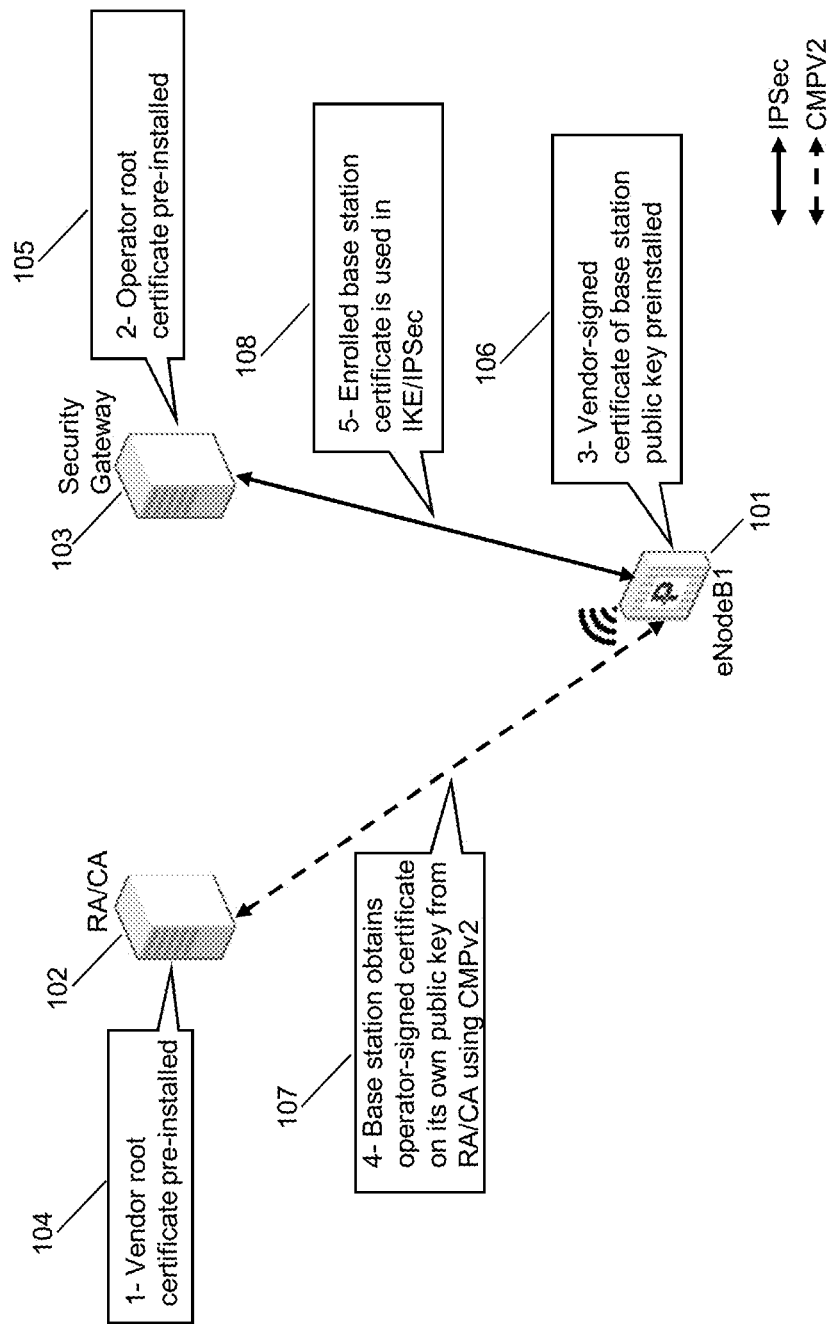
FIG. 1 is a prior art security architecture for base station certificate enrollment.

The detailed description set forth below is intended as a description of various configurations of the subject matter and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details. In some instances, well-known structures and components are shown in block diagram form in order to avoid obscuring the concept of the subject technology.

Overview

Within an LTE Mobile Network, an eNodeB is typically provisioned with a Factory Signed Digital Certificate. And the eNodeB authenticates itself with the operator's RA/CA using CMP protocol. The CMP protocol messages may be exchanged with the RA/CA over using OpenSSL, TCP-messaging protocol on top of TCP, HTTP, TCP-messaging over HTTP, FTP, SMTP, POP, etc., each one uses a different port number. Therefore, the base station need to open multiple ports while receiving an OPERATIONAL certificate from the mobile packet core (MPC) of different operators. For example, using CMP over SSH for obtaining operational certificate from RA/CA using traditional method would require SSH and CMP ports to be opened both at the RA/CA and the eNodeB. The need of opening multiple ports therefore increases the security risk to the radio access network and/or the mobile packet core network.

In most prior art networks, base stations are set up rarely, and are configured manually. However, in certain cases it may be desirable to enable base stations to be configured automatically, such that a portion of the configuration is done at the factory (which may be manual or automated or a combination) and a portion is done automatically in the field using configuration instructions stored on the base station when it is activated. Another characteristic of most prior art networks is that it may be desirable for a base station to be virtualized and hidden from the operator core network. In such a case, the operator core network may have limited or no information about the base station. However, this case makes it difficult for the base station to properly acquire authentication certificates.

In a Virtualized Distributed Radio Access Network (RAN) a collection of Access Cells handles User Equipment (UE) connectivity via a secure tunnel to a Virtualized SeGW. The virtualized nature of the RAN abstracts the complex Access Network architecture from the Mobile Packet Core (MPC) Network and presents itself as a monolithic Access Cell. Before Access Cells may begin to transport UE signaling and data traffic to the MPC Packet, the Access Cell node may be required to be authenticated, authorized before a secure encrypted IPsec tunnel with the MPC may be established. Authentication and authorization are implemented via the use of X.509 Digital Certificates.

The goal of the Access Network is to provision Access Cells in geographically dispersed locations in order to provide maximum coverage. In order to access the certificate enrollment functionality provided by the RA/CA nodes which exist within the operator's secure network, a means of establishing a secure tunnel into the operator's network prior to being provisioned with Operational Digital Certificates is required. The operator's SeGW should be able to authenticate the Access Cell which is being provisioned in the field. A seamless, secure method which does not require manual intervention from an installer is required.

As mentioned in this disclosure, the base station or eNodeB, installed with only FACTORY certificate, when first powered on, the base station needs to get the OPERATIONAL certificate from the RA/CA of the MPC. Instead of using CMP over TLS or SSH or SSL, when the base station first powered on, it establishes the IPSec tunnel using IKEv2 with the coordinating server. The coordinating server may act as a proxy or gateway between the base station and the RA/CA. The IPSec tunnel established between the base station and the coordinating server is able to carry different kinds of traffic securely between them without opening many different kinds of ports for different protocol messages being exchanged between the base station and the coordinating server. For example, port number 4500 may be opened for IPSec tunnel between the base station and the coordinating server. The IPSec tunnel once established would be able to carry IKEv2 and ESP data traffic without opening additional ports at the base station or the coordinating server. IKEv2 is a IPSec control protocol and uses port number 4500. ESP is a data path and data packets are characterized by protocol type number 51. In addition, the IPSec tunnel established between the base station and the coordinating server, while the base station only has FACTORY certificate may allow traffic only from certain IP address and port number via traffic selectors. For example, the coordinating server may allow or forward only CMP traffic from the base station to the coordinating server that arrives via the IPSec tunnel to the RA/CA of the MPC. All other kind of traffic may be blocked until OPERATIONAL certificate is issued by the RA/CA. The IPSec tunnel established using the FACTORY certificate and the IPSec tunnel established using the OPERATIONAL certificate may use the same port number 4500. Therefore, no other port needs to be opened either on the base station or the coordinating server. This brings the benefit of decrease in security risk from opening many different ports. The base station may be connected to multiple mobile opertor's core network and may therefore require connecting to RA/CA of multiple mobile operator's core network. The need for opening multiple ports to connect to RA/CA of multiple core network significantly increases the security risks to the base station and the radio access network or the mobile core network. Therefore, establishing the priming tunnel between the base station and the coordinating server using a single port provides security to the base station and the radio access network and mobile core network. The coordinating server already enjoys the trusted connection relationship to the RA/CA in the MPC and therefore may act as a proxy or gateway authenticating the base stations, where the base stations only have FACTORY certificate. An ability to use the single port for an IPSec tunnel, primary and operational, between the base station and the coordinating server is the key here. The other approaches for example using secure transport has a drawback that it offers only managed file transfer capability and therefore is limited in the functionality or capability it offers. The IPSec tunnel once established between the base station and the coordinating server allows the provisioning of the base station securely and remotely from the coordinating server the IPSec tunnel. Similarly, using self-signed certificate for CA based PKI system has a drawback that certificate cannot be revoked. However, using the IPSec tunnel between the base station and the coordinating server does not limit the type of protocol that may be carried through the tunnel and is completely configurable by traffic selectors by the operator of the MPC. While different schemes for certificate enrollment exist such as SCEP, CMP, etc., these schemes do not support end to end security and do not support any other functionality except certificate management. Each scheme of certificate enrollment and management e.g., SCEP and CMP are operable using different port number. Thus, using SCEP and CMP for all available functionality and probable flows, the base station and the coordinating server may need to open multiple ports, thereby increasing security risk to the base station and the coordinating server. Contrary, the use of IPSec tunnel for certificate enrollment and receiving operational certificate offers end to end security using only a single port.

In a typical radio access network, base stations in the radio access network required secured backhaul connection to the mobile operator's core network. This requires the base station pre-provisioned with a public-private key pair by the vendor, and also have the vendor signed certificate of its public key pre-installed. On initial contact to the operator's network the base station establishes a communication channel to the RA/CA of the operator. The base station sends a request for certificate using certificate management protocol (CMP) version 2 (CMPv2). The network authenticates the messages from the base station based on the vendor-signed certificate of the base station and the vendor root certificate pre-installed in the network. The base station may check the integrity of the protection on the messages from the RA/CA based on the operator root certificate provisioned in the base station. The RA/CA sends to the base operator-signed certificate in response to the request for certificate sent from the base station. During the execution of the CMPv2 protocol for receiving operator-signed certificate, private keys associated to the public keys are exchanged over unsecured network. Additionally, base stations may not be installed with vendor-signed certificate and may require manual intervention.

A solution is presented in this disclosure whereby an access cell or a base station in a radio access network (RAN) may securely communicate with the mobile operator's core network via an encrypted IPSec Tunnel without manual intervention in-order to enroll with an RA/CA and obtain an X.509 digital Certificate to be used to join the operator's network and integrate with the mobile operator's core network or mobile packet core (MPC).

Parallel Wireless's product portfolio includes HetNet Gateway (HNG)™ to orchestrate and manage the Radio Access Network (RAN) across multiple technologies, including 3G, 4G and Wi-Fi, with high ease of use. The centerpiece of the Parallel Wireless solution is the HetNet Gateway, which is the wireless industry's first carrier-grade, high-performance RAN orchestrator that is based on software-defined networking (SDN) and network functions virtualization (NFV), and is 100 percent compliant with all open and standard interfaces as defined by the 3rd Generation Partnership Project (3GPP). The Parallel Wireless HNG virtualizes the RAN interfaces to manage the 4G and 3G (Long Term Evolution, or LTE, and universal mobile telecommunications system, or UMTS) RANs (Home NodeBs/NodeBs and eNodeBs/HeNodeBs) in real-time via multi-technology self-organizing network (SON) and gateway functionality while abstracting RAN changes from the core network and the core network itself from the RAN. The Parallel Wireless HNG virtualizes thousands of base stations to look like a smaller number of virtualized "boomer cells" to the core. The Parallel Wireless HNG also virtualizes radio network nodes such as Wi-Fi access points (APs), eNodeBs and NodeBs and makes them self-configurable, self-adjustable, and self-healing, helping with initial installation and ongoing maintenance. The Parallel Wireless HNG acts like a virtual radio network controller (vRNC or virtual RNC) for multi-RAT network handling resources for different technologies 3G, LTE/4G and Wi-Fi while optimizing call processing towards radio and core network elements such as the mobile switching center (MSC), serving global packet radio system (GPRS) support node (SGSN), gateway GPRS support node (GGSN), evolved packet core (EPC) for 4G, home subscriber server (HSS), and policy charging and rules function (PCRF). The HNG may also be referred as a coordinating server, or a gateway server in this disclosure.

In an LTE network, the HetNet Gateway (Parallel Wireless HNG) node logically sits between the eNodeBs and the MNO Evolved Packet Cores (EPCs) or mobile packet core (MPC). It orchestrates thousands of base stations to look like a single one to the MNO packet core. The Parallel Wireless HNG virtualizes the radio network resources such as eNodeBs and backhaul and makes them self-configurable and self-adjustable. It acts as HeNBGW and vRAN/virtual eNB. It allows plug and play operation of CWS nodes and mesh backhaul, and allows them to form an ad hoc network as the nodes come in to the network and leave.

In accordance with some embodiments, the coordinating server may virtualize all the cells connected on an access side and presents itself as a large macro eNodeB towards a mobile operator's core network. This method of virtualization may be made possible by assigning a twenty-bit macro eNodeB ID, that is advertised towards the core network, and each cell or base station that may connect to the coordinating server may be assigned a twenty-eight-bit E-UTRAN Cell Identifier (ECI). ECI assigned to each cell or base station may have most significant twenty bits same as macro eNodeB ID assigned to the coordinating server. In essence, each cell on the radio access network side may be like a sector of a large macro. As ECI is a total of twenty-eight bits and the macro eNodeB ID is twenty bits, there may be a total of 255 cells that may be represented by the coordinating server as a large macro eNodeB to the core network, in some embodiments. A coordinating server therefore may appear as one large macro eNodeB, referred in this disclosure as a virtual eNodeB (VeNB), virtualizing up to 255 different Cell ID base stations to the core network. Because of the virtualization of the of the access cells, identification and authentication of the access cell with the RA/CA in the MPC becomes difficult.

In accordance with some embodiments, the base station may be located in a first security domain and the core network security server may be in a second security domain and the security gateway proxy (or B2BUA or gateway or NAT server, etc.) functions as a gateway between the two security domains.

In accordance with some embodiments, the base station may be pre-loaded with a factory certificate for authenticating itself in the first security domain to a first security server, which may be the security gateway proxy itself. The base station may contain instructions for obtaining a second certificate, an operational certificate, for authenticating itself in the second security domain (the operator security domain). The base station may first authenticate itself with the first security server using a first authenticated credential, the factory/vendor certificate, which may be unique to the base station. In some embodiments the station is limited to certain actions when authenticating with this certificate. The base station may be preloaded with information for identifying the first security server, such as a DNS name or address for identifying the security server. The base station may then set up an encrypted tunnel with the first security server using the first authenticated credential. The first security server may traverse the gateway to the operator certificate server in the second security domain to obtain automatically a second certificate to be used to authenticate with the operator security gateway in the second security domain. The equipment manufacturer has access to the first security certificate at the factory and potentially the first security server, but need not have access or control over the second security certificate or the second security server or the second security domain.

The base station may then set up a second encrypted tunnel using the second security certificate for authentication. Encryption of tunnels may be encrypted using session keys that are negotiated between the base station and the security gateway in a particular security domain and may therefore automate the process of enrolling of the base station in the MPC of the operator.

In some embodiments the base station may be virtualized behind a RAN virtualization gateway, which is a gateway that hides the base station from the core network by acting like a proxy and back to back gateway. The base station may be enabled to obtain security certificates by using the RAN virtualization gateway as a gateway to access the core network. This provides the benefits of virtualization, specifically, being able to scale to an arbitrary number of base stations, while also providing the benefits of improved automation for certificate delivery without manual certificate configuration for each base station.

In some embodiments, during the factory provisioning phase of an Access Cell, a unique vendor supplied Digital Certificate (known as the Factory Digital Certificate) is installed on the element. This certificate allows for the establishment of an IPsec tunnel with the operator's SeGW node. Upon field provisioning of the Access Cell, the system may be configured to establish said IPsec tunnel with the SeGW using the Factory Digital Certificate. This secure IPsec tunnel utilizing the Factory Digital Certificate can then be used for restricted communication with the operator's private and protected RA/CA infrastructure.

In some embodiments, the Factory Digital Certificate which is utilized during the field provisioning phase is not part of the same authentication/authorization space as that of Operational Digital Certificates which are issued by the Mobile Network Operator (MNO) for access to the MPC. In other words, the RA/CA servers in the MPC used while the base station has a FACTORY certificate and while the base station has an OPERATIONAL certificate may be different. The FACTORY certificate pre-installed on the base station may be based on the hardware characteristics of the base station or the radio access device such as a femto cell, macro cell, or a wireless access gateway. The FACTORY certificate may not depend on the type of the mobile packet core (MPC) the base station or the radio access device may be attempting gain full access. The hardware characteristics that may be provided in the FACTORY certificate may be for example a hardware identifier of the radio interface card. The information about the hardware identifier of the radio interface card populated in the FACTORY certificate may be used by the coordinating server for authentication purpose.

The SeGW node utilized for access to the MPC may therefore provide IPsec termination points which can authenticate the Factory Digital Certificate as well as the Operational Digital Certificates to be utilized by remote Access Cells. The SeGW IPsec endpoint should therefore be able to authenticate Factory Digital Certificates issued to Access Nodes.

In some embodiments, in order for a field provisioning IPsec tunnel to be established as mentioned in above, both peers may authenticate the other utilizing the Factory Digital Certificates. Once established the Access Cell has a secure encrypted IPsec tunnel into the MPC. At this point the Access Cell is utilizing a restricted IPsec tunnel. The restricted IPsec tunnel which is based upon the Factory Digital Certificate is configured such that the IPsec defined Traffic Selectors within the Security Policy Database (SPD) may allow traffic from the Access Cell to the RA/CA nodes within the operator's MPC. RFC 7296 defines the negotiation of Traffic Selectors via Internet Key Exchange (IKE) version 2 (IKEv2) for IPsec/ESP tunnels. RFC 4301 and RFC 4303 define the SPD utilized for maintaining Traffic Selectors for individual IPsec ESP Security Associations.

IKEv2 is used for security key exchange to set up a security association in the IPSec protocol suite. The security association may be established between two network entities to support secure communication. The two network entities may be a base station and a coordinating server, which are attempting to establish a secure tunnel between them in order to get the OPERATIONAL certificate. The negotiation between the base station and the coordinating server may occur using Diffie-Hellman key exchange. The actual keys are not exchanged between the network entities, but negotiations are performed between the network entities, the base station and the coordinating server, to generate keys that may be then used to encrypt the traffic according to IPSec protocol.

Encapsulating Security Payload (ESP) protocol is used to provide confidentiality, data origin authentication, connectionless integrity, and limited traffic flow confidentiality, and used to establish a data tunnel between the base station and the coordinating server. Once IKE and ESP data tunnel are established between the base station and the coordinating server, IPSec restricted access selectors are applied when the coordinating server determines that the certificate presented by the base station is only a FACTORY certificate and no OPERATIONAL certificate is obtained by the base station. The coordinating server while the base station only has FACTORY certificate, allows traffic only from certain well-known ports related to CMP, SECP, and OCSP protocols to allow the base station to receive an OPERATIONAL certificate. Once the base station receives the OPERATIONAL certificate, the initial IPSec tunnel, referenced in this disclosure as a priming tunnel or a first encrypted tunnel, may be torn down and new IPSec tunnel may be established between the base station and the coordinating. The new IPSec tunnel, also may be referenced as a second encrypted tunnel, between the base station and the coordinating server may be established using the OPERATIONAL certificate, and therefore there may be no restriction on the traffic flowing between the base station and the coordinating server. The coordinating server, sitting between the base station, a femto cell, a macro cell, or a wireless access gateway attempting to gain the full access to the mobile packet core of the operator may act as a proxy or gateway to the MPC. The coordinating server therefore may be able to act as a gateway or a proxy to the base stations, femto cells, macro cells, or wireless access gateways managed or virtualized by the coordinating server.

In some embodiments, utilizing the established field provisioning IPsec tunnel described above, the Access Cell can communicate with the RA/CA within the MPC. The Access Cell may be configured to use a Shared Secret or a Factory Digital Certificate to authenticate with the RA/CA. Via the Factory supplied Digital Certificate, the Access Cell is able to establish a trust relationship. Once trust relationship is established, the Access Cell may be able to enroll with the RA/CA and obtain an Operational Digital Certificate. Thereby, the purpose of the field provisioning IPsec Tunnel has been served. In order to obtain operational access to the MPC the Access Cell should now terminate the field provisioning IPsec Tunnel and establish an operational IPsec Tunnel utilizing the newly obtained Operational Digital Certificate with the operator's SeGW in order to be able to integrate with the operator's MPC and provide services.

In some embodiments, the Operational IPsec Tunnel established as a result allows complete access to the operator's MPC enabling signaling and data plane traffic to flow from the Access Cell to MPC entities, thus providing cellular services to UE elements.

In some embodiments, in the event that an Access Cell reboots, as long as the Operational Digital Certificate is still valid, the field provisioning phase for obtaining an Operational Digital Certificate may not be executed. In the event that the Operational Digital Certificate is invalid, as long as the Factory Certificate is still valid, the field provisioning phase which invokes RA/CA enrollment may be repeated and in essence perform a re-enrollment. This allows the operator to determine a security policy. The validity of the Factory Digital Certificate may be established such that the given Access Cell has a limited time frame in which it can be successfully deployed. Alternatively, the Factory Digital Certificate may be set for an extended period of time, allowing the Access Cell to be taken off-line for long durations after which the enrollment process for connectivity to the operator's MPC may be performed anew.

In some embodiments, the number of attempts to retrieve the Operational Digital Certificate may be limited to an operator specified configurable option. In some embodiments, the Factory Digital Certificate may be provisioned to expire after an operator or vendor specified time period.

During steady-state operation during which the Access Cell has authenticated to the operator's MPC with the Operational Digital Certificate, communication with the operator's RA/CA is available. This allows for the Access Cell to invoke certificate renewal functions such as renewal and validation as defined via PKI operations.

In some embodiments, a sub-system may provide and/or implement Public Key Infrastructure (PKI) functionality. The PKI functionality may utilize Certificate Management Protocol (CMP), Online Certificate Status Protocol, and Simple Certificate Enrollment Protocol (SCEP). Other protocols may be supported. The PKI sub-system may support Certificate Revocation Lists (CRL) and may be based on X.509v3 certificate standards. Public Key Cryptography Standard #12 (PKCS #12) and possibly Privacy Enhanced Mail (PEM) as well as Distinguished Encoding Rules (DER) may be utilized for certificate/key encoding. The PKI sub-system implementation may comply with 3GPP TS 33.310 Release 10 or later.

In some embodiments, a PKI sub-system may be required at the coordinating server and the base station to allow for the coordinating server node to authenticate base stations when a base station joins the Self Organizing Network Mesh (SON), in some embodiments.

In some embodiments, a software module running in parallel with other software modules on top of an operating system may be implemented to provide support for the aforementioned PKI standard protocols and formats. Each such module may be called a UniTask. A CertMgr UniTask may be responsible for communication with the operator's Certificate Authority to perform authentication of peer certificates, renewals of certificates, etc. The CertMgr may notify subscribers to the CertMgr of updates, revocations, etc. A DHCPMgr UniTask on the base station may manage the routing and interface configuration within the SON ecosystem. The DHCPMgr may be notified by the CertMgr of updates. The DHCPMgr may be responsible for coordinating the actions of other sub-systems such as an IPsecMgr UniTask and a WiFiMgr UniTask, in some embodiments. The CertMgr UniTask may act as a local node server for other UniTasks within the given sub-system eco-system (i.e. the coordinating server or the base station).

In some embodiments, the CertMgr may listen for certificate management protocol (CMP), online certificate status protocol (OSCP), and simple certificate enrollment protocol (SCEP) communication on the "localhost" node address, and the IPsecMgr and the WiFiMgr may be configured to use CMP, OCSP, and SCEP services provided by the CertMgr on localhost. In some embodiments, the IPsecMgr may retain certain certificate verification functionality and may use it to provide IKEv2 tunnel establishment functionality. In some embodiments, the CertMgr may provide caching proxy functionality for PKI authentication, including CMP, OCSP and SCEP.

In some embodiments, the CertMgr may provide one or more of the following functions: communicating with the configured operator's Certificate Management System (CMS)/Certificate Authority (CA); managing the CA Certificate; managing the given End Entity (the coordinating server or the base station) certificate; caching CRLs obtained from the CA; caching Peer Certificates (i.e. IPsec IKEv2 Peers as well as WiFi WPA2 Peers); checking Peer Certificates for Revocation; renewing the given End Entity (SeGW/coordinating server or base station) certificate; signaling sub-systems (i.e. the IPsecMgr and the WiFiMgr) when various crypto operations need to be performed (examples are IKEv2 re-authentication when a certificate is renewed, or IKEv2/IPsec tunnel termination upon peer certificate revocation); and providing a publication/subscription service for other consumers (UniTasks) in order to disseminate certificate events and actions.

Each end entity within the eco-system (i.e. the coordinating server and base station) may require an X.509v3 based certificate and key. In addition, each end entity may store the certificate for the operator's internal CA. All said certificates may be kept in persistent storage on the given end entity.

In some embodiments, an operator may require the use of Certificate Revocation Lists (CRL) and suitable functionality. Certificate revocation lists are static lists of certificates issued by a given CA which have been revoked. The CRL may be stored in the same location as the end entity certificates and keys. This may therefore vary depending upon the platform. The CertMgr UniTask may be responsible for downloading the CRL from the CA. The CertMgr may also be responsible for monitoring the lifetime of the CRL and creating alarms/events for invalid scenarios involving the CRL. A shortage of storage for a CRL may cause an alarm to be generated. The CertMgr UniTask may maintain the given node certificate as well a CRLs for the given operator domain. The CertMgr may be responsible for maintaining both the Factory Certificate and the Operational Certificate.

PKI Setup at the Coordinating Server

In some embodiments, Initial Bootstrapping of Operational Certificate may be performed at a network node as follows. The following scenario would take place when a coordinating server first brought on-line, where the coordinating server is a Parallel Wireless HetNet Gateway or other network node located between the radio access network and the core network (in communication with both). In this situation, only the FACTORY certificate exists. After the first OPERATIONAL certificate has been obtained in theory there should never be a gap of time in which no valid OPERATIONAL certificate for the coordinating server exists.

The DHCPMgr queries the CertMgr via IPC for active certificate; the CertMgr replies with FACTORY certificate (no OPERATIONAL exists).

The CertMgr initiates SCEP to CMS to obtain OPERATIONAL Certificate.

The CertMgr instructs the DHCPMgr as to success/failure for OPERATIONAL Certificate status.

The DHCPMgr instructs the IPsecMgr to initiate IPsec server with OPERATIONAL certificate if successfully obtained.

The DHCPMgr sets timer to automatically retry SCEP if no OPERATIONAL certificate was obtained.

SECP Update of Certificate

In some embodiments, the OPERATIONAL certificate may be valid for a period specified by the operator of the MPC. The CertMgr may be required to perform an update of the OPERATIONAL certificate when a given widow of time is entered before the certificate is set to expire. Upon startup the CertMgr may receive a configuration which indicates what the window is for the certificate update. The CertMgr may establish a timer to fire when the window is entered. The CertMgr may event upon successful update of the OPERATIONAL certificate. The CertMgr may alarm upon failure of an update of the OPERATIONAL certificate.

In some embodiments, upon failure, the CertMgr may continue to attempt to update the OPERATIONAL certificate until the current certificate fails to be valid and communication with the operator's network is terminated.

In some embodiments, upon successful update of the certificate, the CertMgr may deprecate the current certificate but maintain it in persistent storage. This may be done for only the most recently deprecated certificate.

In some embodiments, upon successful update of the certificate, the CertMgr may instruct the IPsecMgr to execute an IKE_AUTH re-authentication with all peers so as to initiate usage of the new certificate.

In some embodiments, the CertMgr may maintain a data structure of all active peer certificates. Each IPsec tunnel may utilize a certificate for authentication. In addition, each WiFi backhaul link may utilize the same certificate to authenticate the back-haul peer. The CertMgr may regularly audit the list of peer certificates, and may terminate an IPsec tunnel on failure of OCSP or CRL validation.

OSCP Validation of Certificate

In some embodiments, the IPSecMgr may first send IPSec Tunnel Establishment request to the CertMgr to establish an IKE/IPSec tunnel with a given peer. The IPSecMgr notifies the CertMgr of the peer's distinguished name (DN). The CertMgr registers peer's DN and then utilizes OSCP and/or a CRL to monitor the status of the peer's certificate. The CertMgr instructs the IPSecMgr to establish IPSec Tunnel by sending IPSec Tunnel Establishment response. The CertMgr may send certificate status request message over OSCP to Certificate Authority (CA) in the MPC to validate the certificate and may wait for certificate status response for peer DN over OSCP from CA. In the case, the certificate status response for peer DN from CA indicates that the certificate has been revoked, the CertMgr then notifies the IPSecMgr of the said revocation and the IPSecMgr would then terminate the connection with the peer.

CRL Update

In some embodiments, the CertMgr may maintain a certificate revocation list (CRL) for the given operator's domain. The CRL may be utilized in the situation in which the certificate management system (CMS) OSCP server is unavailable. In some embodiments, the CRL may be preferred over OSCP protocol. The CertMgr may perform the following for CRL update.

In some embodiments, the CRL will be updated from the CMS on a regular basis as specified by the user or operator of the radio access network or MPC. In some embodiments, a time may be established to fetch the most recent CRL. The interval at which this is retrieved from the CMS may be configurable by the operator.

In some embodiments, an alarm may be generated when fetching of the CRL results fails. In some embodiments, when fetching of CRL fails, previously fetched CRL may be used. In some embodiments, the CRL may be stored in persistent storage. In some other embodiments, CRL may be maintained or stored in memory. In some embodiments, the CRL may be stored in memory due to inadequate persistent storage and alarm may be generated in this instance.

Peer Certificate Maintenance

In some embodiments, the CertMgr may maintain a data structure of all active peer certificates. Each IPsec tunnel may utilize a certificate for authentication. In addition, each WiFi backhaul link may utilize the same certificate to authenticate the back-haul peer. The CertMgr may regularly audit the list of peer certificates, and may terminate an IPsec tunnel on failure of OCSP or CRL validation. The peer certificate maintenance may be achieved as following.

In some embodiments, the IPSecMgr may instruct the CertMgr when a new tunnel is established and may inform the CertMgr of the peer certificate.

In some embodiments, the IPSecMgr may instruct the CertMgr when a tunnel is terminated with a peer such that the CertMgr can remove the certificate from its database of active peer certificates. The database may be external database or may be an in-memory database.

In some embodiments, command line interface may be provided to query and display the certificates of IPSec peers.

In some embodiments, the CertMgr may regularly audit the list of peer certificates and perform an OSCP or CRL check for each. Upon failure of OSCP or CRL verification, the security gateway or the coordinating server may terminate IPSec tunnel to the peer. The audit interval may be configured at the coordinating server by the operator of the MPC or radio access network. This configuration may also be pushed to the base station. The base station's initial configuration file may contain a configurable option to allow overriding of the interval.

Base Station PKI Setup

In some embodiments, Initial Bootstrapping of Operational Certificate may be performed at another network node as follows. The following scenario would take place when a base station was first brought on-line, where the base station may be a Parallel Wireless Converged Wireless System or other radio access network (RAN) base station or network node. The base station may be an eNodeB, a Wi-Fi mesh network node, or another cellular base station or wireless local area network access point, or both, e.g., a multi-radio access network (multi-RAT) node. The base station identifies the coordinating server using hard-coded IP address or the hard-coded fully qualified domain name (FQDN) at the base station. The base station may be in communication with the coordinating server hard-coded either as a IP address or a FQDN at the base station.

The following scenario would take place when the base station is first brought on-line. In this situation, only the FACTORY certificate exists. After the first OPERATIONAL certificate has been obtained there should, in theory, never be a gap of time in which no valid OPERATIONAL certificate for the base station exists. The following occurs during the PKI setup at the base station.

In some embodiments, after obtaining WAN IP Address, the DHCPMgr queries the CertMgr via IPC for active certificate; the CertMgr replies with FACTORY certificate (no OPERATIONAL exists).

The DHCPMgr instructs the IPsecMgr to start IPsec tunnel to SeGW using FACTORY certificate.

The IPsecMgr queries the CertMgr for current certificate and the CertMgr replies with FACTORY certificate.

The IPsecMgr establishes tunnel to coordinating server or the SeGW with FACTORY certificate.

The IPsecMgr instructs the DHCPMgr that tunnel is established.

The IPsecMgr instructs the CertMgr that tunnel is established.

The CertMgr initiates CMP to CMS Proxy i.e. the coordinating server to obtain OPERATIONAL Certificate (uses IAK).

The CertMgr instructs the DHCPMgr as to success/failure for OPERATIONAL Certificate status.

The DHCPMgr instructs the IPsecMgr to terminate tunnel established earlier using FACTORY certificate.

The DHCPMgr instructs the IPsecMgr to initiate OPERATIONAL tunnel if OPERATIONAL certificate has been successfully obtained.

The IPsecMgr queries the CertMgr for current certificate and the CertMgr replies with OPERATIONAL certificate.

In some embodiments, the DHCPMgr sets timer to retry with FACTORY certificate if no OPERATIONAL certificate was obtained.

The port used for the priming tunnel or the first encrypted tunnel established between the base station and the coordinating server using FACTORY certificate, and the port used for the operational tunnel or the second encrypted tunnel established between the base station and the coordinating server using the OPERATIONAL certificate is same. Thus, only single port needs to be opened between the base station and the coordinating server, thereby reducing the security risk both at the base station and the coordinating server.

Post Factory Bootstrapping with Operational Certificate

In some embodiments, for post Factory Bootstrapping with Operational Certificate, when the base station has already obtained its OPERATIONAL certificate, the FACTORY certificate is no longer in use. The DHCPMgr may determine that the OPERATIONAL certificate is active and in use, and the DHCPMgr may orchestrate the start of the IKE/IPsec tunnel with the IPsecMgr. This may be achieved as described below.

In some embodiments, the DHCPMgr after obtaining WAN IP address, sends certificate type request to the CertMgr. The CertMgr responds with the certificate type response as OPERATIONAL certificate. The DHCPMgr may then instruct the IPSecMgr to initiate IPSec Tunnel establishment by sending IPSec Tunnel Start Request using OPERATIONAL certificate and enter into steady state mode. The IPSecMgr queries The CertMgr for current certificate and upon receiving current certificate as OPERATIONAL certificate from the CertMgr, the IPSecMgr establishes IPSec Tunnel and updates the DHCPMgr by sending IPSec Tunnel Start response. In some embodiments, the DHCPMgr then instructs the CertMgr to start certificate management for validation and updates. The CertMgr may then enable CMP and OCSP timers in renewing the end entity certificate as well as verifying the certificates of any WiFi Backhaul peers and the security gateway or coordinating server.

CMP Update of Certificate and Re-Authentication

In some embodiments, when the CertMgr has determined that its end entity OPERATIONAL certificate is set to expire, it may re-authenticate. The configured window for expiration has been entered. The CertMgr initiates a CMP renewal operation with the CMS. Upon receiving the new certificate, the CertMgr communicates the availability of the new certificate to the DHCPMgr which initiates an IKE/IPsec tunnel re-authentication. The CertMgr raises an event to notify the coordinating server that the end entity certificate has been renewed/replaced. This may be achieved as described below.

In some embodiments, the CertMgr connects to CMS to update certificate that is currently possessed by sending certificate renewal request and receiving certificate renewal response. Upon successful receipt of the certificate renewal request, the CertMgr may send certificate update request to the DHCPMgr. The DHCPMgr may send IPSec Re-authentication request to the IPSecMgr and the IPSecMgr may query the CertMgr for certificate request and receive certificate response from the CertMgr. The IPSecMgr may then send IPSec Re-authentication response to the DHCPMgr. The DHCPMgr may then send Certificate Update response to the CertMgr.

In some embodiments, when a base station's peer certificate has been revoked, the following steps may occur for OCSP verification. The base station may invoke OCSP to validate the certificate which it currently possesses for the SeGW. This validation fails and the IKE/IPsec tunnel to the SeGW may be terminated by the IPsecMgr. The IPsecMgr notifies the DHCPMgr that the tunnel has been terminated. The IPsecMgr may raise an alarm for this event. This may be achieved as described below.

In some embodiments, the CertMgr connects to CMS to update certificate that is currently possessed by sending certificate renewal request and receiving certificate renewal response. Upon failed receipt of the certificate renewal request or indication that the certificate has been revoked, the CertMgr may send certificate revocation request to the DHCPMgr. The DHCPMgr may send IPSec Tunnel termination request to the IPSecMgr and the IPSecMgr may then terminate IPSec Tunnel and send IPSec Tunnel termination response to the DHCPMgr. The DHCPMgr may then send Certificate Revocation response to the CertMgr.

In some embodiments, when a base station's peer certificate has been revoked, the following steps may occur for OCSP verification. The base station may invoke OCSP to validate the certificate which is currently possessed for the SeGW. This validation fails and the IKE/IPsec tunnel to the SeGW may be terminated by the IPsecMgr. The IPsecMgr may notify the DHCPMgr that the tunnel has been terminated. The IPsecMgr may raise an alarm for this event.

FIGURES

FIG. 1 is a prior art security architecture for base station certificate enrollment. The elements of this security architecture are a base station 101, a registration authority/certificate authority (RA/CA) 102 and a security gateway 103 as described in 3GPP TS 33.310. The RA/CA 102 may be pre-installed with vendor root certificate as shown in 104. The security gateway 103 may be pre-installed with root certificate as shown in 105. The base station 101 may be pre-provisioned with a public-private key pair by the vendor, and may have the vendor-signed certificate of its public key pre-installed as shown in 106. On initial contact to the operator network, the base station 101 may establish a communication channel to the RA/CA 102 of the operator. The communication channel between the base station 101 and the RA/CA 102 is over certificate management protocol (CMP) version 2 (CMPv2). The base station 101 sends request for the certificate to RA/CA 102 over CMPv2. RA/CA upon authentication of the request sent by the base station 101 using pre-installed vendor-signed certificate of the base station and the vendor-root certificate pre-installed in the network as shown in 107. The base station 101 may check the integrity of the messages received from RA/CA 102 based on the operator root certificate provisioned in the base station. The RA/CA 102 may send the operator signed certificate to the base station 101 as shown in 107. During this execution, the base station 101 communicates to the RA/CA 102 using CMPv2 protocol over unsecured network. The base station 101 provides proof of possession of private key associated to the public key to be certified over unsecured network. The base station 101 after enrollment with RA/CA 102 may use the operator-signed certificate received from RA/CA 102 to authenticate itself to the security gateway 103 and establishes IPSec tunnel for secured communication as shown in 108. As described, the steps mentioned above requires that the base station to communicate to the MPC over unsecured network, and the process may require manual steps and may not be simple plug-n-play operation.

The solution described in this disclosure brings benefits of communication over a secure network, automation of IPSec tunnel creation using PKI setup at the MPC and only limited access until full operational certificate is received from the RA/CA of the MPC. The base station pre-installed with FACTORY certificate may only have limited access.

Figure 2:
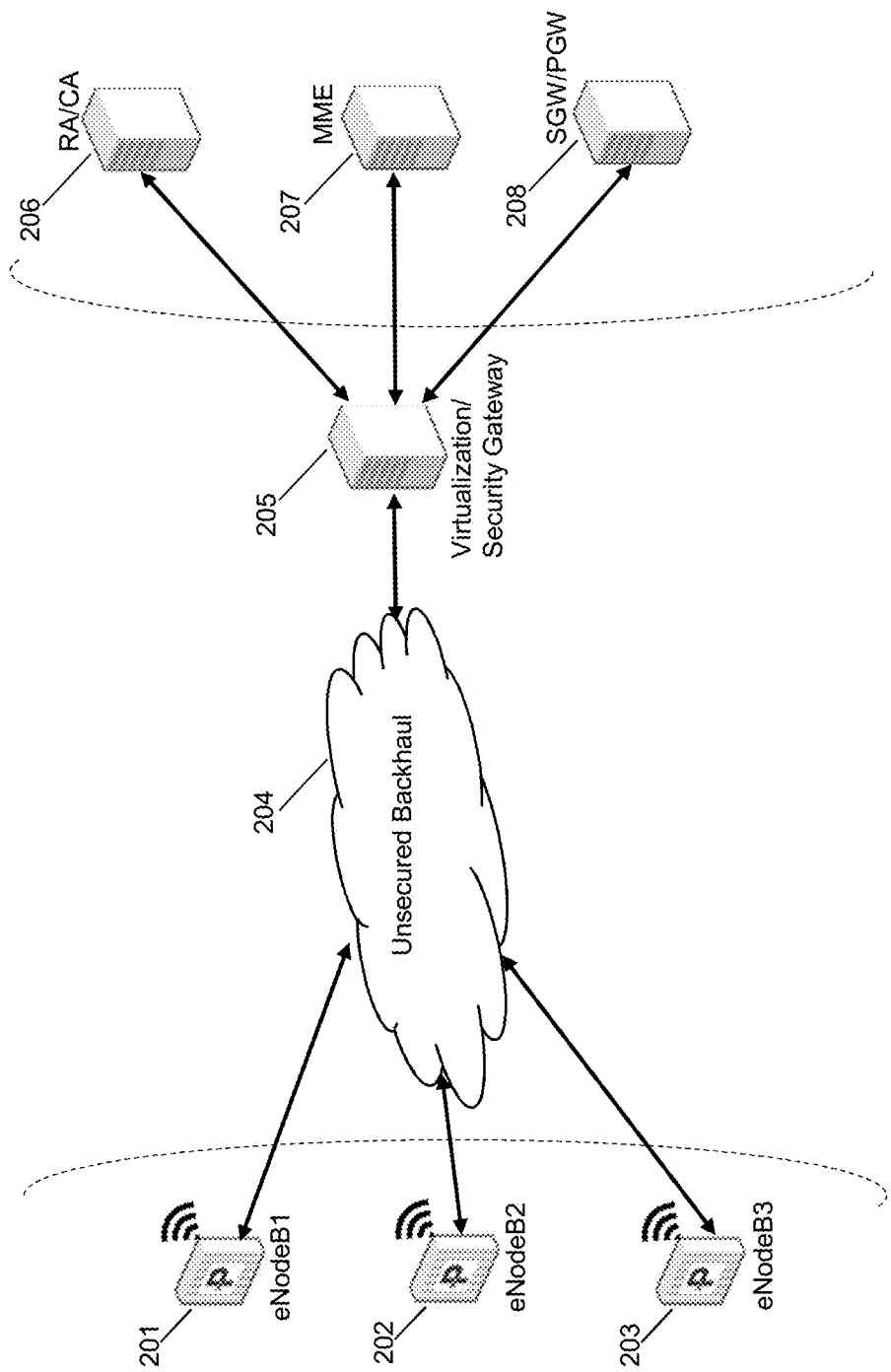
FIG. 2 is an exemplary network architecture diagram, in accordance with some embodiments.

FIG. 2 is an exemplary network architecture diagram in accordance with some embodiments. The base stations eNodeB1 201, eNodeB2 202, and eNodeB3 202 may be located at geographically dispersed located in radio access network (RAN). Further the base stations 201, 202, and 203 may be virtualized cells and may be managed by a virtualization or security gateway server 205. The base stations 201, 202, and 203, and the virtualization or security gateway server 205 may communicate over unsecured backhaul 204. The virtualization or security gateway server 205 may also be referred as a coordinating server 205 or a gateway 205 in this disclosure. The coordinating server 205 is sitting between the base stations 201, 202, and 203, also referred to as access cells 201, 202, and 203 in this disclosure, and mobile packet core (MPC) of the operator. The MPC of the operator may have RA/CA 206, mobility management entity (MME) 207, and serving gateway(SGW)/packet data network gateway (PGW) 208. The MPC may have other elements as well not shown in the figure. The SGW and PGW are shown collocated here as shown in the figure, but may be separate entities in the MPC and not collocated. The base stations 201, 202, 203 may be a multi-RAT node and support 2G, 3G, 4G, 5G, WiFi, WiMax, a Long Term Evolution (LTE), or an LTE-Advanced (LTE-A). All eNodeBs described herein may be in a mixed 3G, 4G, 5G, or other network access technology network. All eNodeBs described herein may also be 3G nodeBs or 5G gNodeBs, as appropriate. The described security infrastructure is appropriate for a variety of network architectures involving a security server behind a security gateway.

Figure 3:
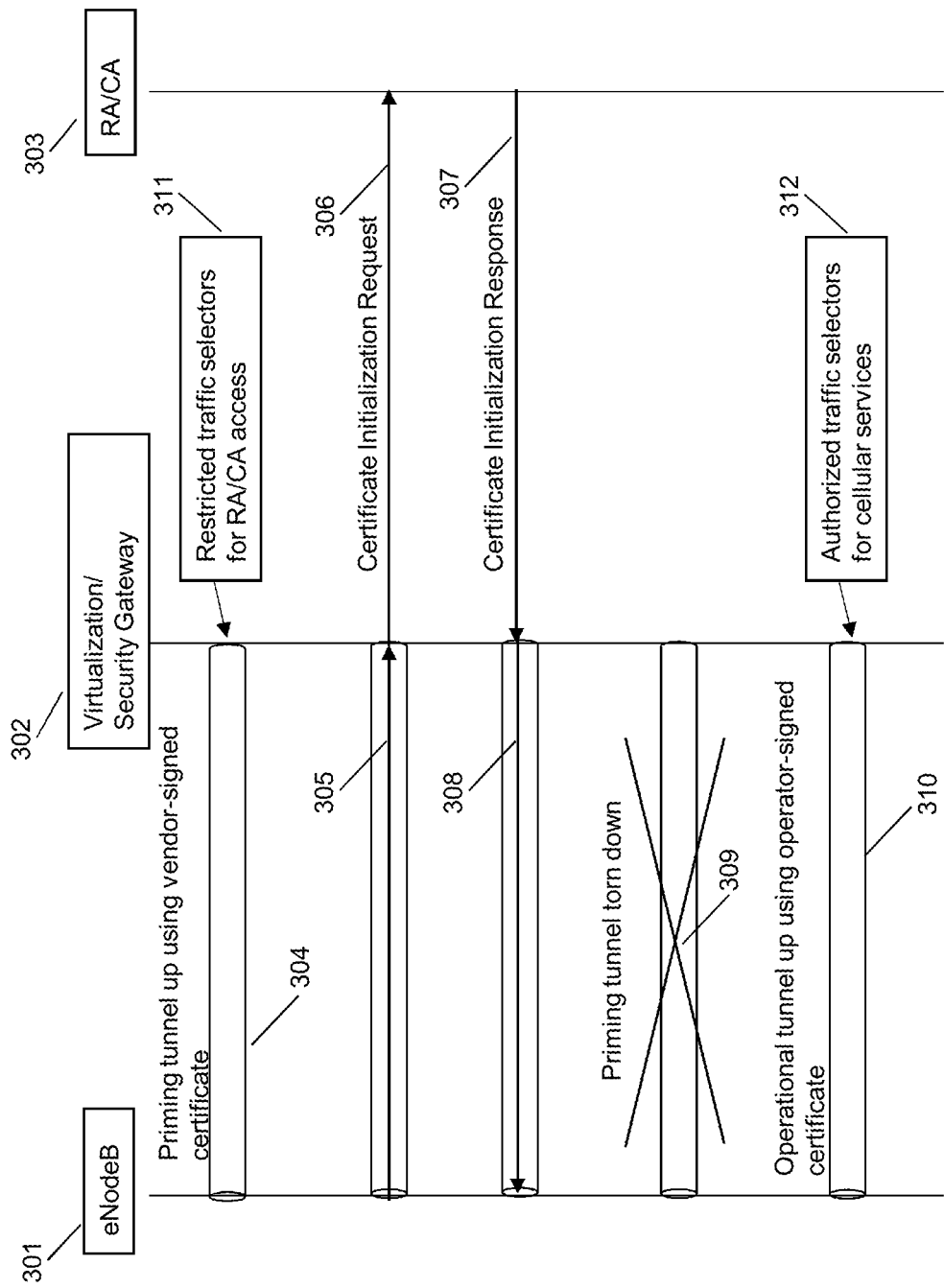
FIG. 3 is a certificate provisioning sequence diagram, in accordance with some embodiments.

FIG. 3 is a certificate provisioning sequence diagram in accordance with some embodiments. As shown in FIG. 2, the network elements of interest here are a base station eNodeB 301, a virtualization/security gateway server 302 and a RA/CA server 303 in the MPC. The eNodeB 301 is the base station or access cell earlier identified as base station 201, 202, 203. The virtualization/security gateway server 303 is the coordinating server 205 as described in FIG. 2. The RA/CA server 303 is the RA/CA server 206 in the MPC. As described above, the base station 301 is pre-installed with a vendor-signed FACTORY certificate. The FACTORY certificate may be used by the base station 301 to authenticate itself to the coordinating server 302. The FACTORY certificate does not provide access to full functionality and access to the MPC. The base station 301 is required to obtain an OPERATIONAL certificate in order to gain full access to the MPC and to transport user equipment (UE) signaling and data traffic to the MPC of the operator. The base station 301 may be in a first security domain and the MPC may be in a different security domain. The coordinating server 302 may act as a security gateway proxy between the base station 301 in a first security domain and the MPC in a second security domain. The RA/CA 303 of the MPC is therefore in a second security domain.

In accordance with some embodiments, the base station 301 using the FACTORY certificate authenticates itself to the coordinating server 302. The FACTORY certificate pre-installed on the base station 301 may be unique to the base station 301. The base station 301 may be pre-loaded with information identifying the coordinating server 302 to be used for authentication using information such as DNS name or address. The base station 301 then sets up an encrypted tunnel, shown in the FIG. 3 as a priming tunnel 304, using the FACTORY certificate between the base station 301 and the coordinating server 302. The priming tunnel 304 may be established after both the peers, the base station 301 and the coordinating server 302, authenticates each other. At this point the base station 301 is utilizing a restricted IPsec priming tunnel 304. The restricted IPsec priming tunnel 304 which is based upon the Factory Digital Certificate is configured such that the IPsec defined Traffic Selectors within the Security Policy Database (SPD) may allow traffic from the Access Cell to the RA/CA nodes within the operator's MPC only as shown in FIG. 3 as 311. RFC 7296 defines the negotiation of Traffic Selectors via IKEv2 for IPsec/ESP tunnels. RFC 4301 and RFC 4303 define the SPD utilized for maintaining Traffic Selectors for individual IPsec ESP Security Associations. RFC 7296, 4301, and 4303 are hereby incorporated by reference in their entirety for all purposes.

In accordance with some embodiments, utilizing the established field provisioning IPsec priming tunnel 304, the base station may communicate with the RA/CA within the MPC via the coordinating server as a proxy and sends certification initialization request 305, 306 to the RA/CA via the coordinating server 302. The base station 301 may be configured to use a Shared Secret or a Factory Digital Certificate to authenticate with the RA/CA 303. Via the Factory supplied Digital Certificate, the base station 301 may be able to establish a trust relationship. Once trust relationship is established the base station 301 may be able to enroll with the RA/CA and obtain an Operational Digital Certificate. The RA/CA 303 may send the Operational Digital Certificate to the base station 301 via the coordinating server 302 acting as a proxy between the base station 301 in a first security domain and the RA/CA in the MPC in a second security domain as shown in FIG. 3 as certificate initialization response 307.

In accordance with some embodiments, once the purpose of the IPSec priming tunnel 304 has been served and the base station 301 receives the operational certificate from the RA/CA 303, the IPSec priming tunnel 304 will be torn down as shown in 309 in FIG. 3. The Operational IPsec Tunnel 310 may be established between the base station 301 and the coordinating server 302 that allows complete access to the operator's MPC enabling signaling and data plane traffic to flow from the base station 301 to MPC entities such as MME 207, SGW/PGW 208, etc., thus providing cellular services to user equipments camped on the base station 301.

Figure 4:
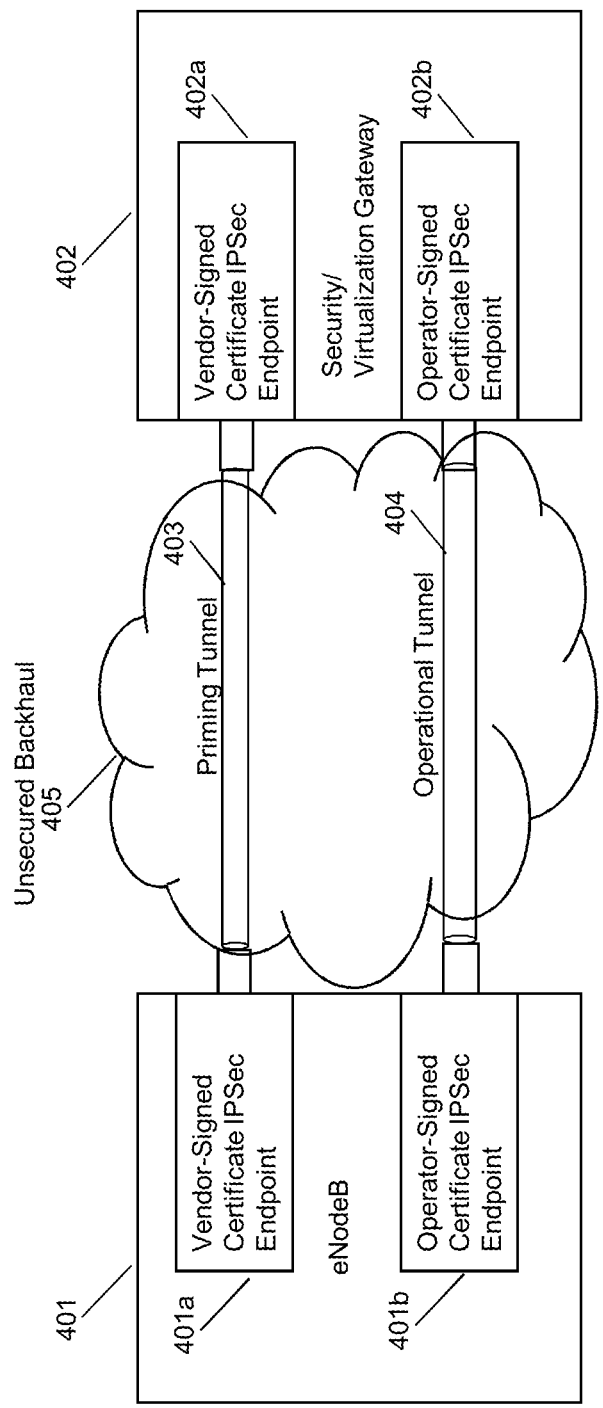
FIG. 4 is an another exemplary network architecture diagram, in accordance with some embodiments.

FIG. 4 is an another exemplary network architecture diagram in accordance with some embodiments. Specifically, FIG. 4 shows certificates involved between a base station 401 and a coordinating server 402 or a virtualization/security gateway server 402. As described above, two different kinds of certificates are involved in the establishment of IPSec tunnel between the base station 401 or the access cell 401 and the coordinating server 402. One is vendor-signed certificate that is mentioned above as FACTORY certificate and second is operator-signed certificate that is mentioned above as OPERATIONAL certificate. Therefore, the base station 401 may need to support vendor-signed certificate IPSec Endpoint 401a and operator-signed certificate IPSec Endpoint 401b, which are endpoints for IPSec priming tunnel and IPSec operational tunnel to the coordinating server 402 respectively. Endpoint 401a and endpoint 401b may be the same endpoint, in some embodiments, insofar as both the endpoints are accessed at the same IP and port number of the coordinating server. The coordinating server is able to disambiguate the different requests by examining the incoming request. In some embodiments, the coordinating server may use the destination IP, the source IP and/or port, the request protocol, the request protocol number, or other information in the request about the destination server to disambiguate. The coordinating server may use IKE traffic selectors and information in the FACTORY certificate to disambiguate traffic towards the final destination, e.g. RA/CA server. The coordinating node may be proxying communications to an operator security gateway or RA/CA, and may be able to identify which nodes are in the process of obtaining an operational certificate. In some embodiments, network address translation (NAT) may be performed in addition to proxying, at gateway 402. Likewise, the coordinating server 402 may need to support vendor-signed certificate IPSec Endpoint 402a and operator-signed certificate IPSec Endpoint 402b, which are endpoints for IPSec priming tunnel and IPSec operational tunnel to the base station 401 respectively.

For example, a eNodeB deployed in the radio access network for the first time and powered on. Upon power-on, the eNodeB software may look into the memory areawhere the pre-installed certificate is generally stored. The pre-installed certificate referred to here as a FACTORY certificate may indicate that the FACTORY certificate is temporary, based on the certificate's validity. The FACTORY certificate may further have information about the coordinating server which the eNodeB is supposed to contact through hard-coded IP address or FQDN. The base station attempts to connect to the coordinating server and may exchange key information for authentication using IKE.

Internet Key Exchange (IKE) uses IP port 500 in some configurations, specifically IKEv1, and this may be used in some embodiments. However, typically companies use NAT to reduce the cost of buying more public IPs, to allow its internal users to access the public Internet. IPsec virtual private network clients use NAT traversal in order to have Encapsulating Security Payload (ESP) packets traverse NAT. IPsec uses several protocols in its operation which must be enabled to traverse firewalls and network address translators: Internet Key Exchange (IKE) (User Datagram Protocol (UDP) port 500); Encapsulating Security Payload (ESP) (uses IP protocol number 50 over UDP port 4500); Authentication Header (AH) (IP protocol number 51); and IPsec NAT traversal (UDP port 4500, when NAT traversal is in use).

NAT is done on the basis of port numbers, where the source port of the inside traffic is mapped to a different port, so that, all the inside users should be able to access the public Internet with the help of few public IPs. ESP/AH being a L3 protocol doesn't have a port number, rather it has a protocol number (IP 50/51 respectively). So, while dealing with NATing device in the transit path of the vpn tunnel, to allow that traffic to pass through NAT, ESP/AH packets are re-encapsulated with the port UDP4500, allowing the ESP/AH inside traffic to successfully pass through tunnel as well as thru NAT, so encryption (traffic thru IPSec tunnel) as well as NATing (hiding the inside IP) is achieved. IKEv2 requires the use of port 4500 and not port 500. The end result is that IKEv2 is compatible with opening only port 4500.

Continuing on, in some embodiments, during the IKEv2 key negotiation, the coordinating server receives the FACTORY certificate, which contains information about the hardware identification of the radio interface of the eNodeB. Additionally, the assigned IP address and port number assigned to the eNodeB by the operator may also be exchanged. The first IP tunnel is then created. All traffic has been sent and received over UDP port 4500 at the coordinating server, which is able to traverse NAT and reduces NAT tracking overhead at any NAT gateway (which may be at the coordinating server, in some embodiments). The coordinating server has been provisioned with the information specific to the base station's identity and the core network or RA/CA server that this base station may contact to obtain the OPERATIONAL certificate. While the base station only has a first priming tunnel authenticated using its FACTORY certificate, the coordinating server may reject all traffic unrelated to certificate management for obtaining OPERATIONAL certificate, using, for example, IPsec traffic selectors associated with the first IP tunnel.

Continuing on, in some embodiments, the coordinating server may act as a proxy to contact the RA/CA of the operator based on the information provisioned at the coordinating server on behalf of the eNodeB, and obtains the OPERATIONAL certificate from the RA/CA. Once the coordinating server receives the OPERATIONAL certificate it may then pass it to the eNodeB over the secured priming tunnel, still over UDP port 4500. eNodeB receives OPERATIONAL certificate, the FACTORY certificate stored at the eNodeB is replaced by the OPERATIONAL certificate. The existing IPSec tunnel between the eNodeB and the coordinating server is torn down and a new security association is created between the eNodeB and the operator RA/CA, via the coordinating server as a proxy, in some embodiments. The coordinating server may now apply a different profile of IKE traffic selectors giving the eNodeB unrestricted access to the MPC. While the tunnel using FACTORY certificate is torn down upon receipt of OPERATIONAL certificate, the OPERATIONAL tunnel may use the same endpoint both at the eNodeB and at the coordinating server. The OPERATIONAL tunnel may continue to use UDP port 4500 for the payload using ESP, facilitating NAT traversal and security at the coordinating server, which is now a security gateway.

Figure 5:
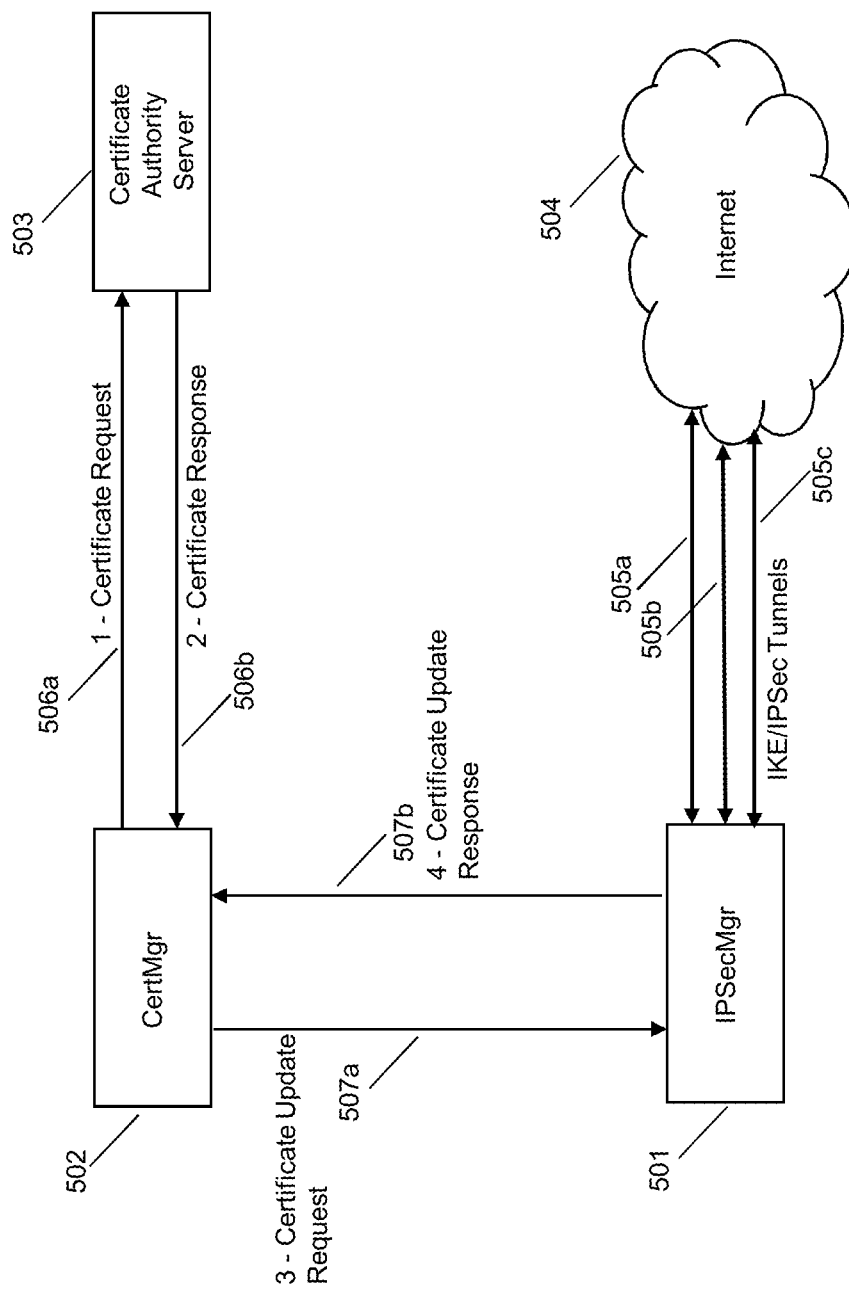
FIG. 5 is a subsystems communication diagram, in accordance with some embodiments.

FIG. 5 is a subsystems communication diagram in accordance with some embodiments. As mentioned, a software module running in parallel with other software modules on top of an operating system may be implemented to provide support for the aforementioned PKI standard protocols and formats. Each such module may be called a UniTask. FIG. 5 shows the communications between UniTasks, a CertMgr 502, an IPSecMgr 501 and a RA/CA 503 in the MPC. The IPSecMgr 501, the CertMgr 502 are UniTasks running at the coordinating server 402.

FIG. 5 shows inter-process communication and start-up sequence when the coordinating server 402 is first brought on-line. The coordinating server 402 may have only the FACTORY certificate. However, after the first OPERATIONAL certificate has been obtained, there may never be a gap of time in which no valid OPERATIONAL certificate of the coordinating server 402 exists. Once the coordinating server 402 is powered up and brought on-line, the DHCPMgr (not shown in the figure) queries the CertMgr 502 via IPC for active certificate. The CertMgr 502 replies with FACTORY certificate (no OPERATIONAL exists). The CertMgr 502 initiates SCEP to CMS or RA/CA 503 to obtain OPERATIONAL Certificate by sending Certificate Request 506a and receives Certificate Response 506b from RA/CA 503. The CertMgr 502 instructs the DHCPMgr (not shown in the figure) as to success/failure for OPERATIONAL Certificate status. The DHCPMgr instructs the IPsecMgr 501 to initiate IPsec server with OPERATIONAL certificate if successfully obtained from RA/CA 503. The CertMgr sends certificate update request 507a to the IPSecMgr 501. The IPSecMgr 501 establishes IKE/IPSec Tunnels 505a, 505b, 505c over the internet. In some embodiments, the DHCPMgr sets timer to automatically retry SCEP if no OPERATIONAL certificate was obtained.

Figure 6:
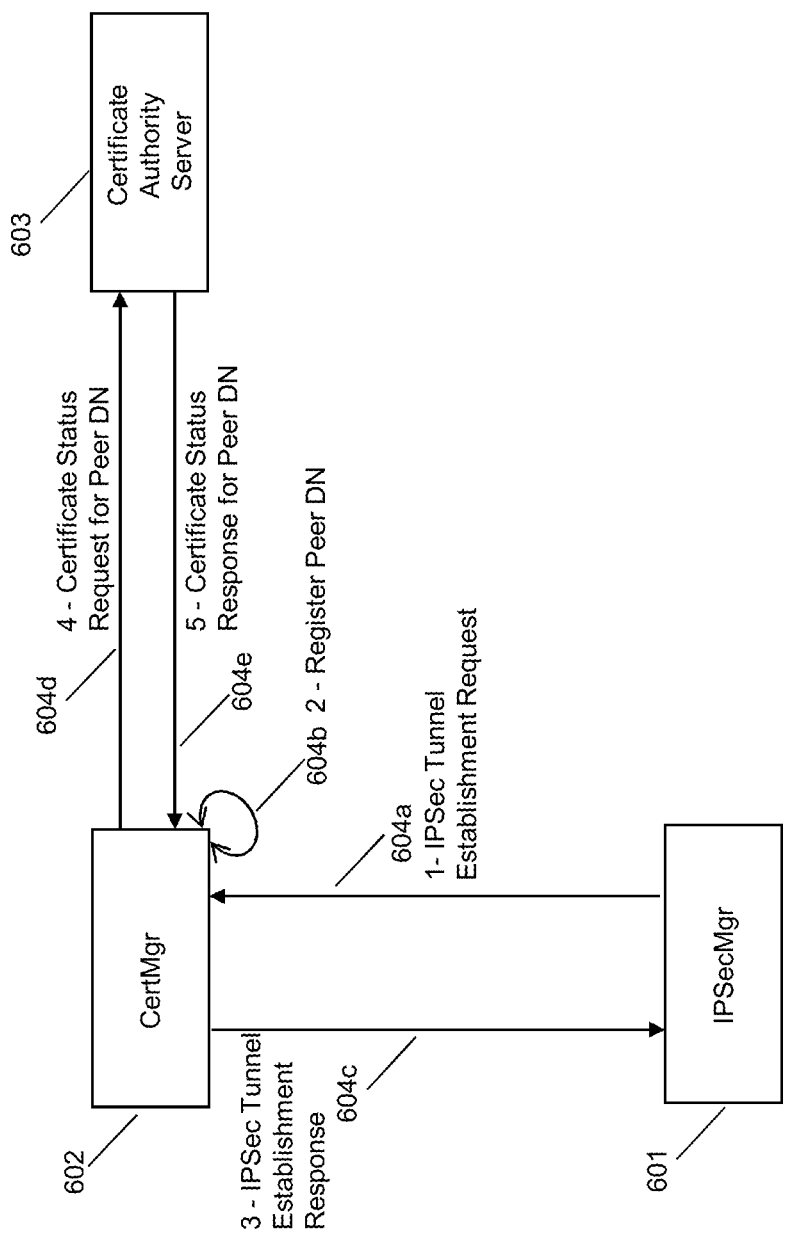
FIG. 6 is a subsystems communication diagram, in accordance with some embodiments.

FIG. 6 is a subsystems communication diagram in accordance with some embodiments. FIG. 6 shows the communications between UniTasks, a CertMgr 602, an IPSecMgr 601 and a RA/CA 603 in the MPC. The IPSecMgr 601, the CertMgr 602 are UniTasks running at the coordinating server 602.

FIG. 6 shows inter-process communication and certificate validation sequence at the coordinating server 402. In some embodiments, the IPSecMgr 601 may first send IPSec Tunnel Establishment request 604a to the CertMgr 602 to establish an IKE/IPSec tunnel with a given peer. The IPSecMgr 601 notifies the CertMgr 602 of the peer's distinguished name (DN). The CertMgr registers peer's DN 604b and then utilizes OSCP and/or a CRL to monitor the status of the peer's certificate. The CertMgr 602 instructs the IPSecMgr 601 to establish IPSec Tunnel by sending IPSec Tunnel Establishment response 604c. The CertMgr 602 may send certificate status request message 604d over OSCP to Certificate Authority (CA) 603 in the MPC to validate the certificate and may wait for certificate status response for peer DN 604e over OSCP from CA 603. In the case, the certificate status response for peer DN from CA indicates that the certificate has been revoked, the CertMgr then notifies the IPSecMgr of the said revocation and the IPSecMgr would then terminate the connection with the peer.

Figure 7:
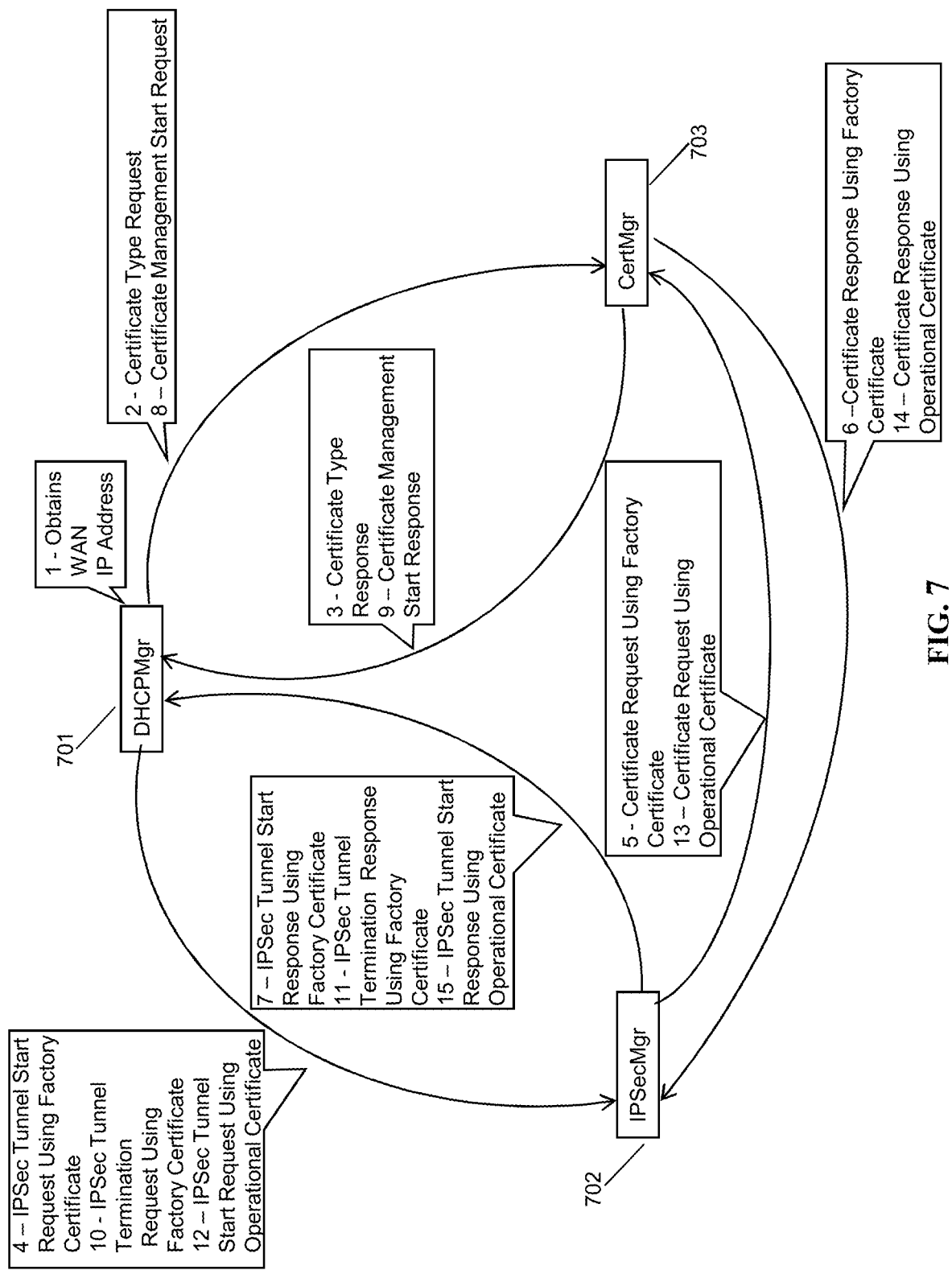
FIG. 7 is a subsystems communication diagram, in accordance with some embodiments.

FIG. 7 is a subsystems communication diagram in accordance with some embodiments for Initial Bootstrapping of Operational Certificate at a base station that has been brought on-line for the first time. The base station may be a Parallel Wireless Converged Wireless System or other radio access network (RAN) base station or network node. The base station may be an eNodeB, a Wi-Fi mesh network node, or another cellular base station or wireless local area network access point, or both, e.g., a multi-radio access network (multi-RAT) node. The base station may be in communication with the coordinating server. The following scenario would take place when the base station is first brought on-line. In this situation, only the FACTORY certificate exists. After the first OPERATIONAL certificate has been obtained there should, in theory, never be a gap of time in which no valid OPERATIONAL certificate for the base station exists. The following occurs during the PKI setup at the base station.

In some embodiments, the DHCPMgr 701 after obtaining WAN IP Address, the DHCPMgr 701 queries the CertMgr 703 for certification type request via IPC for active certificate. The CertMgr 703 replies with FACTORY certificate (no OPERATIONAL exists). The DHCPMgr 701 instructs the IPsecMgr 702 to start IPsec tunnel to SeGW using FACTORY certificate. The IPsecMgr 702 queries the CertMgr 703 for current certificate and the CertMgr 703 replies with FACTORY certificate. The IPsecMgr 702 establishes tunnel to SeGW (not shown in the figure) using FACTORY certificate. The IPsecMgr 702 instructs the DHCPMgr 701 that tunnel is established using FACTORY certificate. The DHCPMgr instructs the CertMgr that tunnel is established. The CertMgr 703 initiates CMP to CMS Proxy or the coordinating server 402 to obtain OPERATIONAL Certificate (uses IAK). The CertMgr 703 instructs the DHCPMgr 701 as to success/failure for OPERATIONAL Certificate status. The DHCPMgr 701 instructs the IPsecMgr 702 to terminate tunnel established earlier using FACTORY certificate. The DHCPMgr 701 instructs the IPsecMgr 702 to initiate OPERATIONAL tunnel if OPERATIONAL certificate successfully obtained. The IPsecMgr 702 queries the CertMgr 703 for current certificate and the CertMgr 703 replies with OPERATIONAL certificate. The IPSecMgr 702 establishes an IPSec Tunnel to the coordinating server 402 using OPERATIONAL certificate and gains full access to the elements in the MPC of the operator. In some embodiments, the DHCPMgr 701 may set a timer to retry with FACTORY certificate if no OPERATIONAL certificate was obtained.

Figure 8:
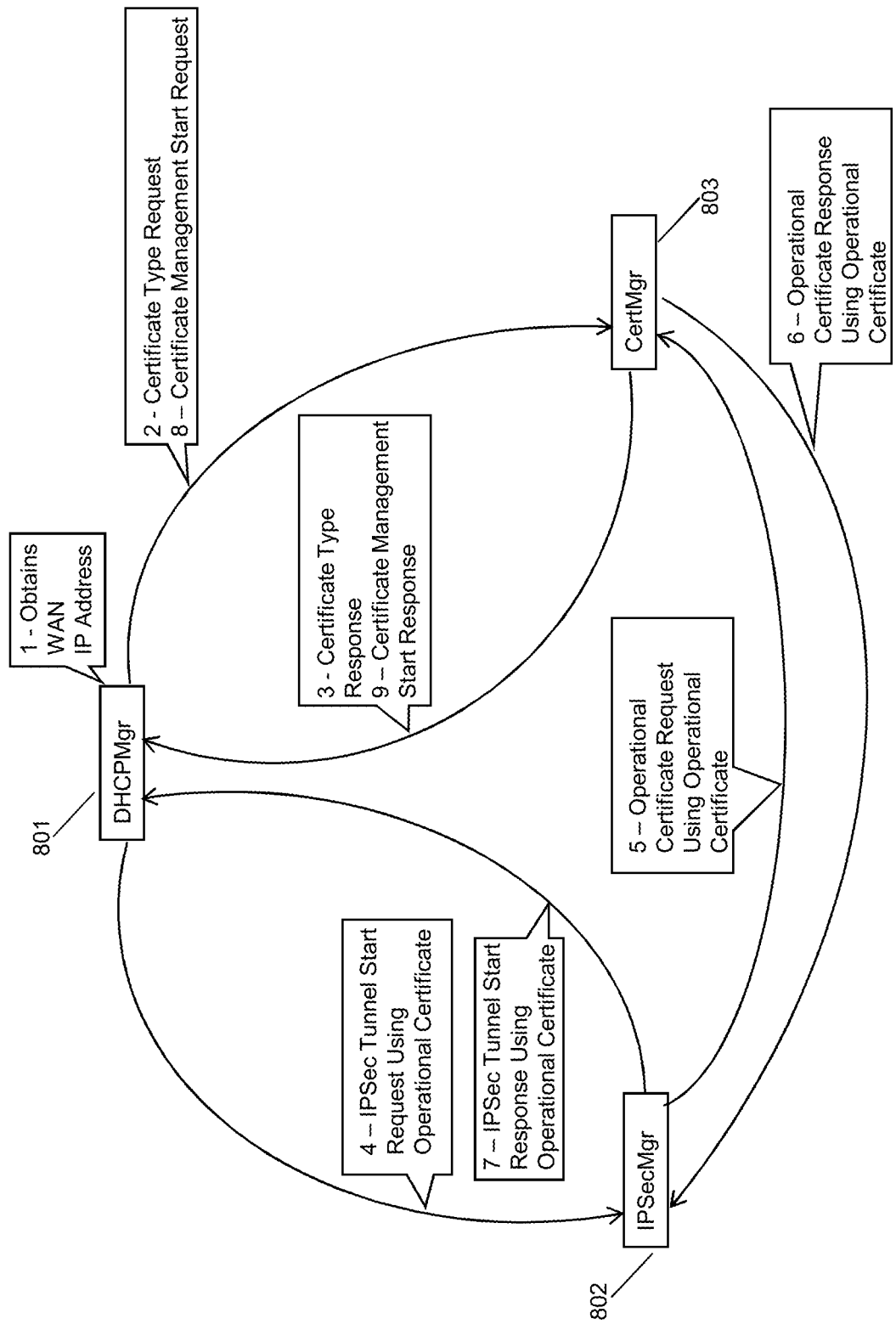
FIG. 8 is a subsystems communication diagram, in accordance with some embodiments.

FIG. 8 is a subsystems communication diagram in accordance with some embodiments for post factory bootstrapping of Operational Certificate at a base station that no longer has FACTORY certificate. The DHCPMgr 801 may determine that the OPERATIONAL certificate is active and in use, and the DHCPMgr 801 may orchestrate the start of the IKE/IPsec tunnel with the IPsecMgr 802.

In some embodiments, the DHCPMgr 801 after obtaining WAN IP address, sends certificate type request to the CertMgr 802. The CertMgr 802 may respond with the certificate type response as OPERATIONAL certificate. The DHCPMgr 801 may then instruct the IPSecMgr 802 to initiate an IPSec Tunnel by sending IPSec Tunnel Start Request using OPERATIONAL certificate and enter into steady state mode. The IPSecMgr 802 may query the CertMgr 803 for current certificate and upon receiving current certificate as OPERATIONAL certificate from the CertMgr 803, the IPSecMgr 802 establishes IPSec Tunnel and updates the DHCPMgr 801 by sending IPSec Tunnel Start response. In some embodiments, the DHCPMgr 801 then instructs the CertMgr 803 to start certificate management for validation and updates. The CertMgr 803 may then enable CMP and OCSP timers in renewing the end entity certificate as well as verifying the certificates of any WiFi Backhaul peers and the security gateway or coordinating server.

Figure 9:
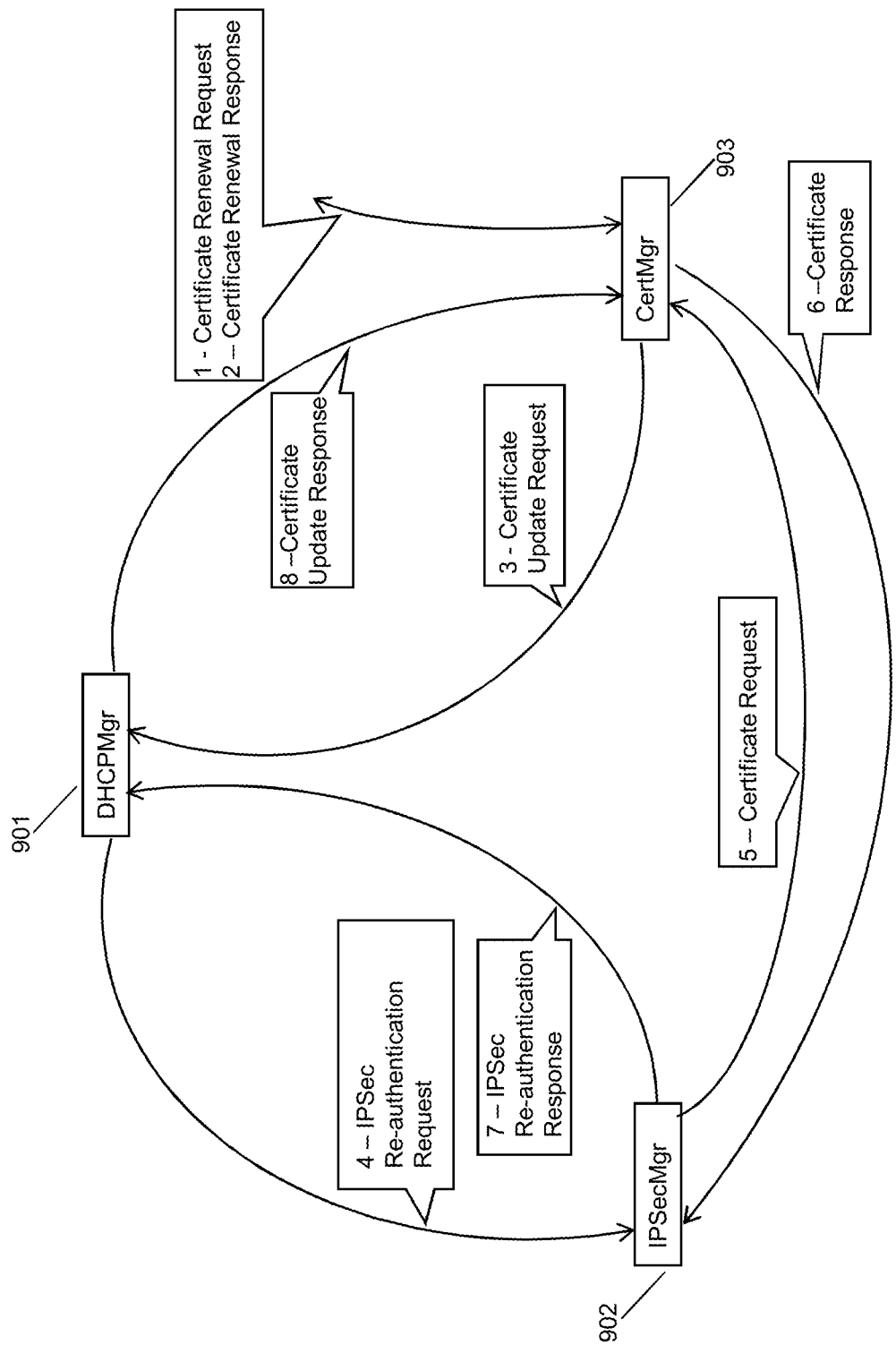
FIG. 9 is a subsystems communication diagram, in accordance with some embodiments.

FIG. 9 is a subsystems communication diagram in accordance with some embodiments when the CertMgr 903 has determined that its end entity OPERATIONAL certificate is set to expire, it may need to be re-authenticated. When the configured window for expiration has been entered, the CertMgr 903 initiates a CMP renewal operation with the CMS or the coordinating server 402. Upon receiving the new certificate, the CertMgr 903 communicates the availability of the new certificate to the DHCPMgr 901 which initiates an IKE/IPsec tunnel re-authentication. The CertMgr 903 may raise an event to notify the coordinating server 402 that the end entity certificate has been renewed/replaced.

In some embodiments, the CertMgr 903 may send certificate update request to the DHCPMgr 901. The DHCPMgr 901 may send IPSec Re-authentication request to the IPSecMgr 902 and the IPSecMgr 902 may query the CertMgr 903 for certificate request and receive certificate response from the CertMgr 903. The IPSecMgr 902 may then send IPSec Re-authentication response to the DHCPMgr 901. The DHCPMgr 901 may then send Certificate Update response to the CertMgr 903.

Figure 10:
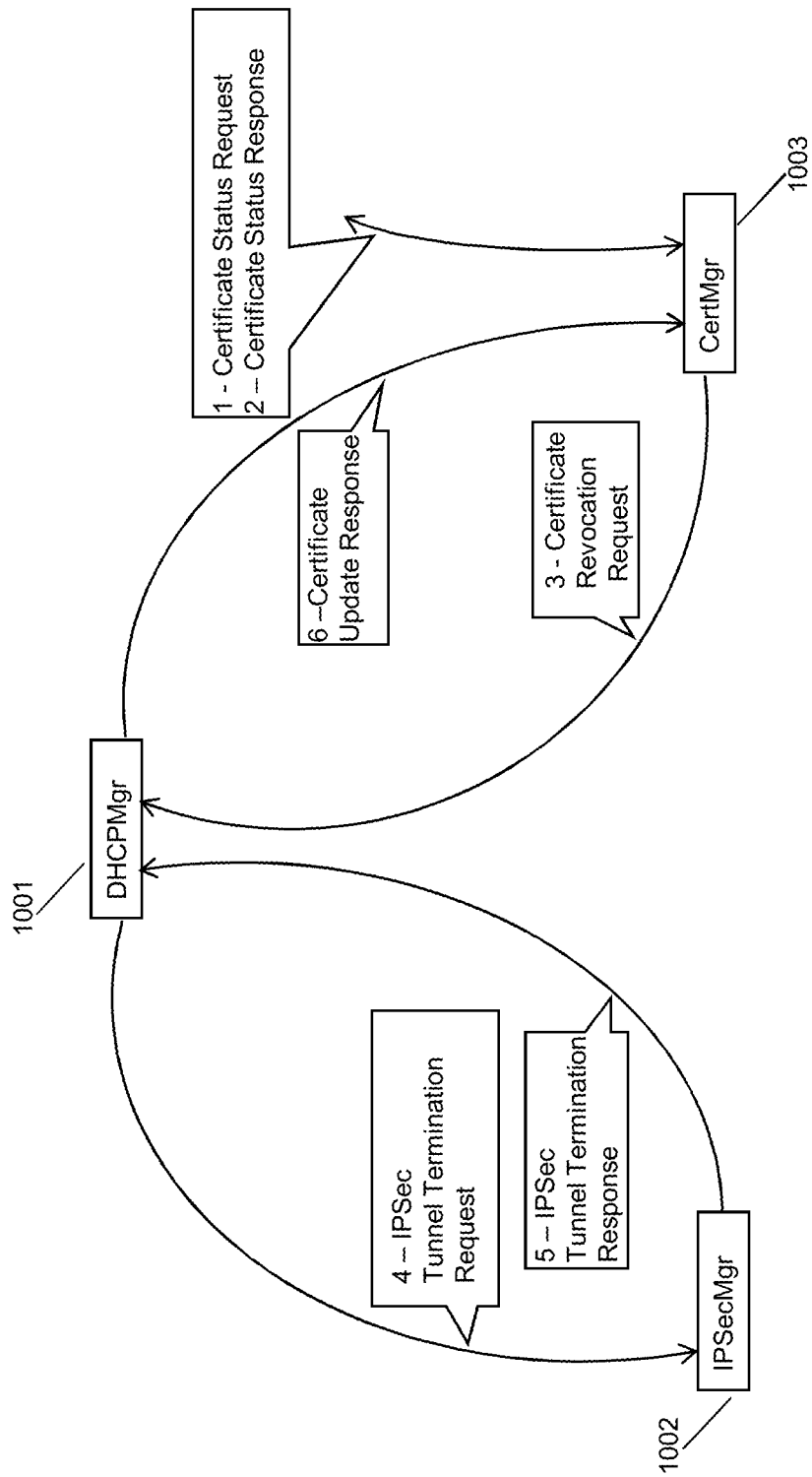
FIG. 10 is a subsystems communication diagram, in accordance with some embodiments.

FIG. 10 is a subsystems communication diagram in accordance with some embodiments when the base station 401's peer certificate for the coordinating server 402 has been revoked. The base station 401 may invoke OCSP to validate the certificate which is currently possessed for the coordinating server and the MPC. If the certificate validation fails, the IKE/IPsec tunnel to the coordinating server 402 is terminated by the IPsecMgr. The IPsecMgr notifies the DHCPMgr that the tunnel has been terminated. The IPsecMgr alarms on this event. This may be achieved as described below.

In some embodiments, the CertMgr 1003 may connect to the CMS or RA/CA to update certificate that is currently possessed by sending certificate renewal request and receiving certificate renewal response. Upon failed receipt of the certificate renewal request or indication that the certificate has been revoked, the CertMgr 1003 may send certificate revocation request to the DHCPMgr 1001. The DHCPMgr 1001 may send IPSec Tunnel termination request to the IPSecMgr 1002 and the IPSecMgr 1002 may then terminate IPSec Tunnel and send IPSec Tunnel termination response to the DHCPMgr 1001. The DHCPMgr 1001 may then send Certificate Revocation response to the CertMgr 1003.

Figure 11:
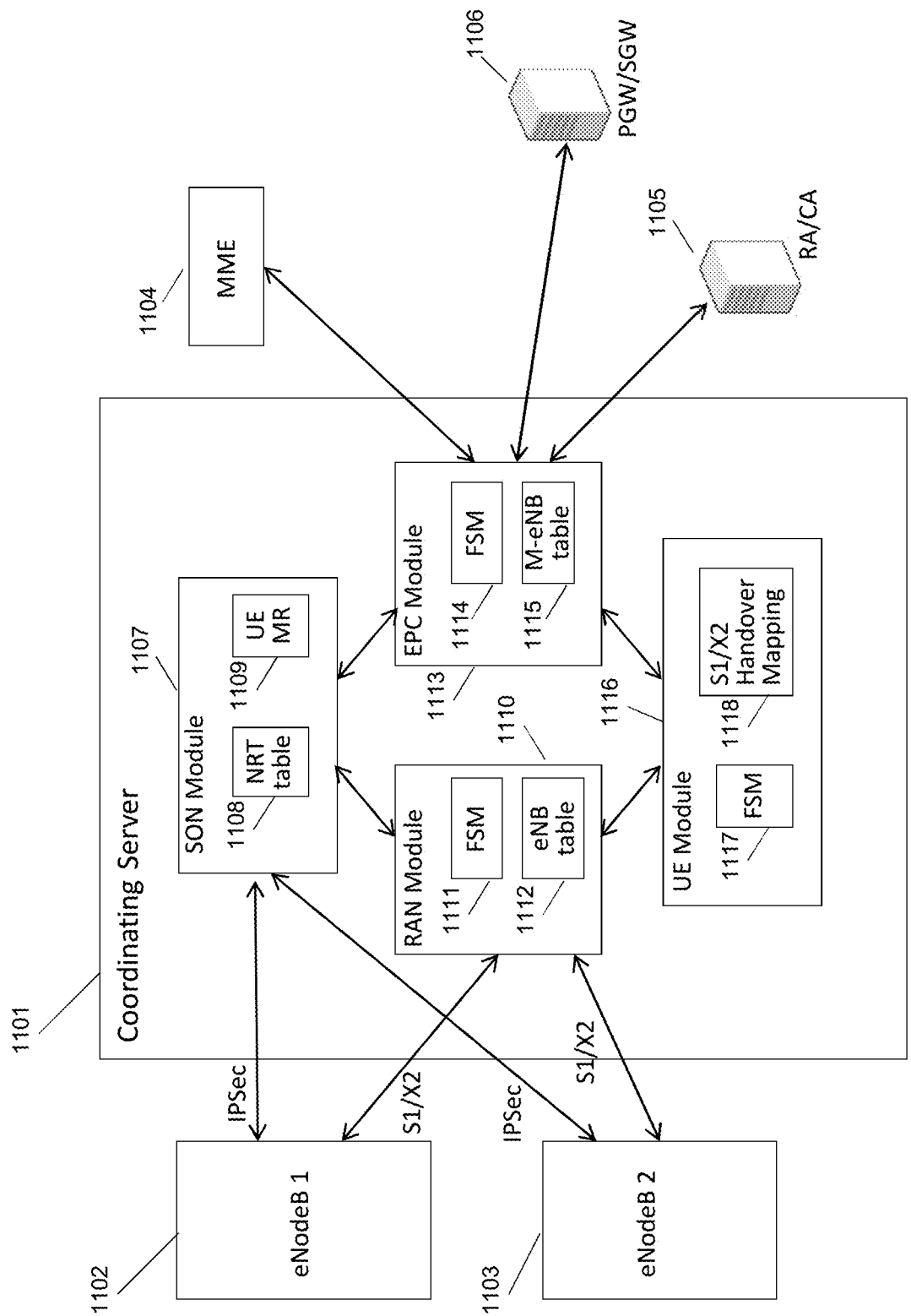
FIG. 11 is a schematic architecture diagram of an exemplary coordinating server, in accordance with some embodiments.

FIG. 11 is a schematic diagram of a coordinating server in a Long Term Evolution (LTE) architecture, in accordance with some embodiments. Coordinating server 701, also may be referred as a gateway in this disclosure, provides services to, and is coupled to, eNodeB 1 1102 and eNodeB 2 1103, on a RAN side of a network (i.e., inside of the gateway). Coordinating server 1101 provides services to, and is coupled to, MME 1104, RA/CA 1105, and PGW/SGW 1106, on a core network side of the network (outside of the gateway).

Within coordinating server 1101 are self-organizing network (SON) module 1111, containing neighbor relation table (NRT) 1112 and UE measurement report processing module 1113; evolved packet core (EPC) module 1121, containing EPC finite state machine module 1122 and macro eNodeB table 1123; radio access network (RAN) module 1131, containing eNodeB finite state machine module 1132 and eNodeB table 1134; and user equipment (UE) module 1141, containing UE finite state machine module 1142 and S1/X2 handover mapping table 1143. Each of modules 1111, 1121, 1131, and 1141 are coupled to each other within coordinating server 1101, and may execute on one or more shared processors (not shown) coupled with memory (not shown).

In some embodiments, SON module 1111 may perform NRT maintenance, load information processing and fractional frequency reuse (FFR) processing; RAN module 1131 may perform X2 association management with eNodeBs 1102, 1103; EPC module 1121 may perform be in communication with RA/CA 1105 and PGW/SGW 1106; and UE module may perform X2 handover and S1/X2 translation between eNodeBs 1102, 1103. All the above managers/modules interact with each other to accomplish the assigned functionality.

Figure 12:
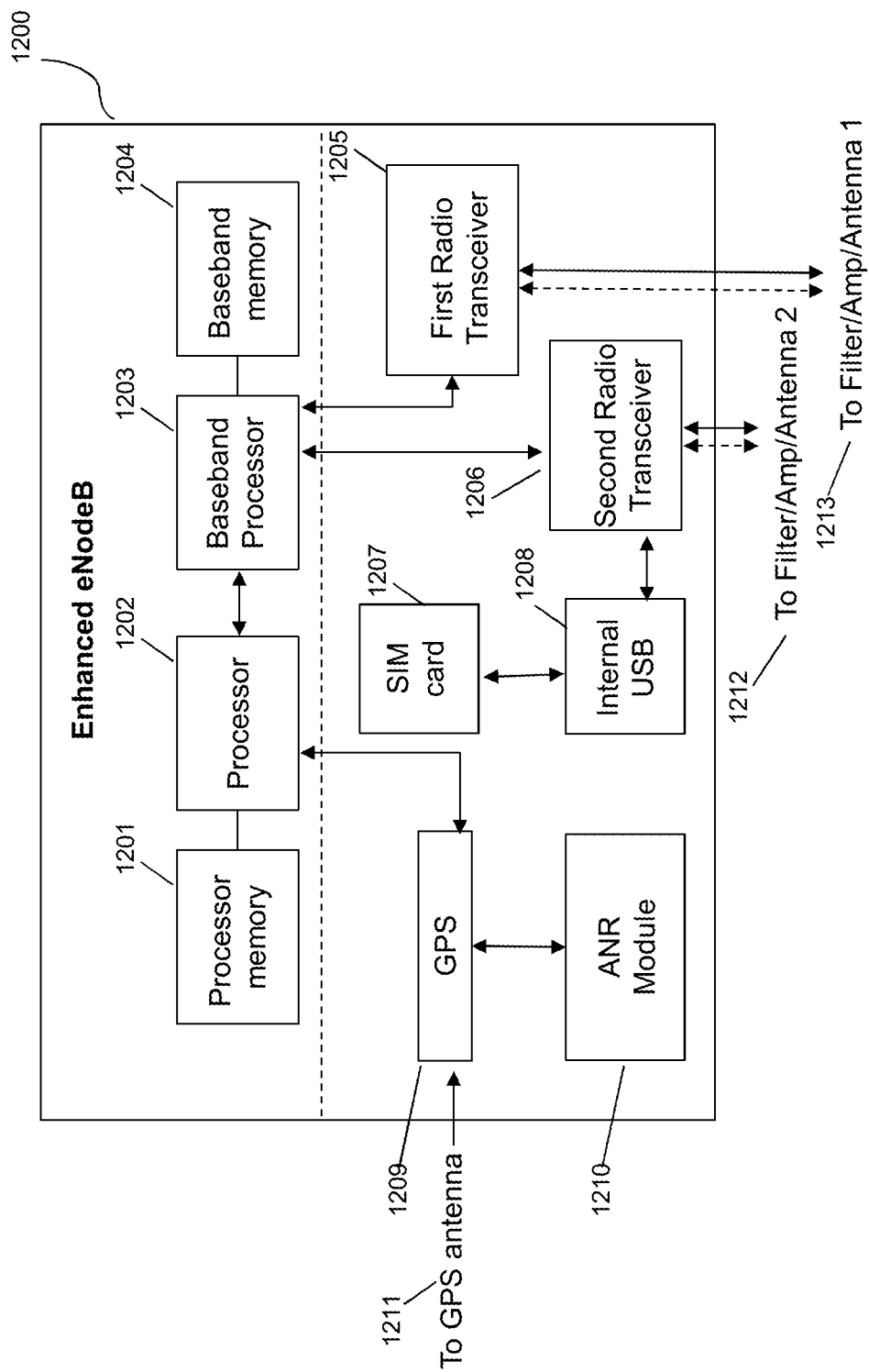
FIG. 12 is a schematic architecture diagram of an exemplary enhanced eNodeB, in accordance with some embodiments.

FIG. 12 is an enhanced eNodeB for performing the methods described herein, in accordance with some embodiments. eNodeB 1200 may include processor 1202, processor memory 1201 in communication with the processor, baseband processor 1203, and baseband processor memory 1204 in communication with the baseband processor. The eNodeB 1200 may also include first radio transceiver 1205 and second radio transceiver 1206, internal universal serial bus (USB) port 1208, and subscriber information module card (SIM card) 1207 coupled to USB port 1208. In some embodiments, the second radio transceiver 1206 itself may be coupled to USB port 1208, and communications from the baseband processor may be passed through USB port 1208. The second radio transceiver may be used for wirelessly backhauling eNodeB 1200.

Processor 1202 and baseband processor 1203 are in communication with one another. Processor 1202 may perform routing functions, and may determine if/when a switch in network configuration is needed. Baseband processor 1203 may generate and receive radio signals for both radio transceivers 1205 and 1206, based on instructions from processor 1202. In some embodiments, processors 1202 and 1203 may be on the same physical logic board. In other embodiments, they may be on separate logic boards.

Processor 1202 may identify the appropriate network configuration, and may perform routing of packets from one network interface to another accordingly. Processor 1202 may use memory 1201, in particular to store a routing table to be used for routing packets. Baseband processor 1203 may perform operations to generate the radio frequency signals for transmission or retransmission by both transceivers 1205 and 1206. Baseband processor 1203 may also perform operations to decode signals received by transceivers 1205 and 1206. Baseband processor 1203 may use memory 1204 to perform these tasks.

The first radio transceiver 1205 may be a radio transceiver capable of providing LTE eNodeB functionality, and may be capable of higher power and multi-channel OFDMA. The second radio transceiver 1206 may be a radio transceiver capable of providing LTE UE functionality. Both transceivers 1205 and 1206 may be capable of receiving and transmitting on one or more LTE bands. In some embodiments, either or both of transceivers 1205 and 1206 may be capable of providing both LTE eNodeB and LTE UE functionality. Transceiver 1205 may be coupled to processor 1202 via a Peripheral Component Interconnect-Express (PCI-E) bus, and/or via a daughtercard. As transceiver 1206 is for providing LTE UE functionality, in effect emulating a user equipment, it may be connected via the same or different PCI-E bus, or by a USB bus, and may also be coupled to SIM card 1207. First transceiver 1205 may be coupled to first radio frequency (RF) chain (filter, amplifier, antenna) 1213, and second transceiver 1214 may be coupled to second RF chain (filter, amplifier, antenna) 1212.

SIM card 1207 may provide information required for authenticating the simulated UE to the evolved packet core (EPC). When no access to an operator EPC is available, a local EPC may be used, or another local EPC on the network may be used. This information may be stored within the SIM card, and may include one or more of an international mobile equipment identity (IMEI), international mobile subscriber identity (IMSI), or another parameter needed to identify a UE. Special parameters may also be stored in the SIM card or provided by the processor during processing to identify to a target eNodeB that device 1200 is not an ordinary UE but instead is a special UE for providing backhaul to device 1200.

Wired backhaul, or wireless backhaul may be used. Wired backhaul may be an Ethernet-based backhaul (including Gigabit Ethernet), or a fiber-optic backhaul connection, or a cable-based backhaul connection, in some embodiments. Additionally, wireless backhaul may be provided in addition to wireless transceivers 1205 and 1206, which may be Wi-Fi 802.11a/b/g/n/ac/ad/ah, Bluetooth, ZigBee, microwave (including line-of-sight microwave), or another wireless backhaul connection. Any of the wired and wireless connections described herein may be used flexibly for either access (providing a network connection to UEs) or backhaul (providing a mesh link or providing a link to a gateway or core network), according to identified network conditions and needs, and may be under the control of processor 1202 for reconfiguration.

A GPS module 1209 may also be included, and may be in communication with a GPS antenna 1211 for providing GPS coordinates, as described herein. When mounted in a vehicle, the GPS antenna may be located on the exterior of the vehicle pointing upward, for receiving signals from overhead without being blocked by the bulk of the vehicle or the skin of the vehicle. Automatic neighbor relations (ANR) module 1210 may also be present and may run on processor 1202 or on another processor, or may be located within another device, according to the methods and procedures described herein.

Other elements and/or modules may also be included, such as a home eNodeB, a local gateway (LGW), a self-organizing network (SON) module, or another module. Additional radio amplifiers, radio transceivers and/or wired network connections may also be included.

The above-described features and applications can be implemented as software processes that are specified as a set of instructions recorded on a computer-readable storage medium (also referred to as computer readable medium). When these instructions are executed by one or more processing unit(s) (e.g. one or more processors, cores of processors, or other processing units), they cause the processing unit(s) to perform the actions indicated in the instructions. Examples of computer readable media include, but are not limited to, CD-ROMs, flash drives, hard drives, RAM chips, EPROMs, etc. The computer-readable media does not include carrier waves and electronic signals passing wirelessly or wired connections.

In the specification, the term "software" is meant to include firmware residing in read-only memory or applications stored in magnetic storage or flash storage, for example, a solid-state drive, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronics systems, define one or more specific machine implementations that execute and perform the operations of the software programs.

A computer program (also known as program, software, software application, script, or code) can be written in any form of programming language, including compiled or interpreted languages, declarative or procedural languages, and it can be deployed in any form, including as a standalone program or as a module, component, subroutine, object, or another unit suitable for use in a computing environment. A computer program may, but need not correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

These functions described above can be implemented in digital electronic circuitry, in computer software, hardware, or firmware. The techniques can be implemented using one or more computer program products. Programmable processors and computers can be included in or packaged as mobile devices. The process and logic flows can be performed by one or more programmable processors and by one or more programmable logic circuitry. General and special purpose computing devices and storage devices can be interconnected through communication networks.

Some implementations include electronic components, for example microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), readable compact discs (CD-R), rewritable compact discs (CD-RW), read-only digital versatile discs (e.g., DVD-ROM, dual-layer DVD-ROM), a variety of recordable/rewritable DVDs (e.g. DVD-RAM, DVD-RW, DVD+RW, etc.), flash memory (e.g., SD cards, mini-SD cards, micro-SD cards, etc.), magnetic or solid-state hard drives, read-only and recordable Blu-Ray® discs, ultra-density optical discs, any other optical or magnetic media, and floppy disks. The computer-readable media can store a computer program that is executed by at least one processing unit and includes sets of instructions for performing various operations. Examples of computer programs or computer code include machine code, for example is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example application specific integrated circuits (ASICs) or field programmable gate arrays (FPGAs). In some implementations, such integrated circuits execute instructions that are stored in the circuit itself.

As used in this specification and any claims of this application, the terms "computer", "server", "processor", and "memory" all refer to electronic or other technological devices. These terms exclude people or groups of people. For the purpose of the specification, the terms display or displaying means displaying on an electronic device. As used in this specification and any claims of this application, the terms "computer-readable media" and "computer readable medium" are entirely restricted to tangible, physical objects that store information in a form that is readable by a computer. These terms exclude any wireless, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, or any other available monitor types, for displaying information to the user and a keyboard and a pointing device, e.g., mouse or trackball, by which the user can provide input to the computer. Other kinds of devices can be used to provide for interaction with a user as well; for example, feedback provided to the user can be any form of sensory feedback, e.g., visual feedback, tactile feedback, or auditory feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication network include a local area network ("LAN"), an inter-network (e.g., the Internet), and peer-to-peer networks (e.g., ad-hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some aspects of the disclosed subject matter, a server transmits data (e.g., an HTML page) to a client device (e.g., for purpose of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components illustrated above should not be understood as requiring such separation, and it should be understood that the described program components and system can generally be integrated together in a single software product or packaged into multiple software products.

Various modifications to these aspects will be readily apparent, and the generic principles defined herein may be applied to other aspects. Thus, the claims are not intended to be limited to the aspects shown herein, but is to be accorded the full scope consistent with the language claims, where reference to an element in singular is not intended to mean "one and only one" unless specifically so states, but rather "one or more." Unless expressly stated otherwise, the term "some" refers to one or more. Pronouns in the masculine (e.g., his) include the feminine and neuter gender (e.g., her and its) and vice versa. Headings and subheadings, if any, are used for convenience only, and do not limit the subject technology.

A phrase, for example, an "aspect" does not imply that the aspect is essential to the subject technology or that the aspect applies to all configurations of the subject technology. A disclosure relating to an aspect may apply to all configurations, or one or more configurations. A phrase, for example, an aspect may refer to one or more aspects and vice versa. A phrase, for example, a "configuration" does not imply that such configuration is essential to the subject technology or that such configuration applies to all configurations of the subject technology. A disclosure relating to a configuration may apply to all configurations or one or more configurations. A phrase, for example, a configuration may refer to one or more configurations and vice versa.

The foregoing discussion discloses and describes merely exemplary embodiments of the present invention. In some embodiments, software that, when executed, causes a device to perform the methods described herein may be stored on a computer-readable medium such as a computer memory storage device, a hard disk, a flash drive, an optical disc, or the like. As will be understood by those skilled in the art, the present invention may be embodied in other specific forms without departing from the spirit or essential characteristics thereof. For example, wireless network topology can also apply to wired networks, optical networks, and the like. The methods may apply to LTE-compatible networks, to UMTS-compatible networks, or to networks for additional protocols that utilize radio frequency data transmission. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Accordingly, the disclosure of the present invention is intended to be illustrative of, but not limiting of, the scope of the invention, which is specified in the following claims.

The invention claimed is:

1. A method, comprising:
configuring, based on hardware characteristics of a radio access device, a first security certificate;
setting up a first encrypted tunnel with a first security server using the first security certificate, the first security server configured to grant permission via the first security certificate for obtaining a second security certificate providing access to an operator core network;
tearing down the first encrypted tunnel; and
setting up a second encrypted tunnel to a second security server within the operator core network using the second security certificate, the second encrypted tunnel configured to allow the radio access device to securely communicate with the operator core network for providing connectivity for user devices to the operator core network,
wherein the second security certificate is an operational certificate containing security information specific to the operator core network, and
wherein the first encrypted tunnel and the second encrypted tunnel use a single transport port,
thereby enabling the radio access device to obtain the second security certificate via the first encrypted tunnel.

2. The method of claim 1, further comprising configuring the first security certificate not based on characteristics of a telecom operator network.

3. The method of claim 1, further comprising setting up the first encrypted tunnel when the radio access device is booted from a factory-configured default state.

4. The method of claim 1, wherein the hardware characteristics of the radio access device include a hardware identifier of a radio interface in the radio access device.

5. The method of claim 1, wherein the first security server is configured to permit communications over Transmission Control Protocol (TCP) port number 4500.

6. The method of claim 1, wherein the first encrypted tunnel and the second encrypted tunnel are encrypted using an IPsec protocol.

7. The method of claim 1, wherein the first security server and the second security server are certificate authorities in a public key infrastructure (PKI).

8. The method of claim 1, wherein the first security certificate is configured to limit traffic using IPsec traffic selectors.

9. The method of claim 1, wherein the radio access device is a small cell, femto cell, macro cell, wireless access point, or wireless access gateway.

10. The method of claim 1, further comprising, at a gateway situated between the radio access device and the operator core network, proxying public key infrastructure (PKI) communications between the radio access device and the operator core network.

11. The method of claim 1, further comprising, at a gateway situated between the radio access device and the operator core network, requesting the second security certificate on behalf of the radio access device.

12. The method of claim 1, further comprising, at a gateway situated between the radio access device and the operator core network, managing security certificates for a plurality of radio access devices.

13. The method of claim 1, wherein the first security server is a gateway situated between the radio access device and the operator core network.

14. The method of claim 1, wherein the radio access device is a virtualized radio access device in a radio access network.

15. The method of claim 1, wherein the first encrypted tunnel and the second encrypted tunnel transport certificate management protocol messages.

16. The method of claim 1, further comprising sending provisioning configuration for the radio access device through the first encrypted tunnel from the first security server to the radio access device.

17. A non-transitory computer-readable medium containing instructions which, when executed on a processor, perform steps comprising:
configuring, based on hardware characteristics of a radio access device, a first security certificate;
setting up a first encrypted tunnel with a first security server using the first security certificate, the first security server configured to grant permission via the first security certificate for obtaining a second security certificate providing access to an operator core network;
tearing down the first encrypted tunnel; and
setting up a second encrypted tunnel to a second security server within the operator core network using the second security certificate, the second encrypted tunnel configured to allow the radio access device to securely communicate with the operator core network for providing connectivity for user devices to the operator core network,
thereby enabling the radio access device to obtain the second security certificate via the first encrypted tunnel.

18. The computer-readable medium of claim 17, the steps further comprising configuring the first security certificate not based on characteristics of a telecom operator network.

19. The computer-readable medium of claim 17, the steps further comprising setting up the first encrypted tunnel when the radio access device is booted from a factory-configured default state.

20. The computer-readable medium of claim 17, wherein the hardware characteristics of the radio access device include a hardware identifier of a radio interface in the radio access device, wherein the first security server is configured to permit communications over Transmission Control Protocol (TCP) port number 4500, wherein the first encrypted tunnel and the second encrypted tunnel are encrypted using an IPsec protocol, wherein the first security server and the second security server are certificate authorities in a public key infrastructure (PKI), wherein the first security certificate is configured to limit traffic using IPsec traffic selectors, wherein the radio access device is a small cell, femto cell, macro cell, wireless access point, or wireless access gateway, wherein the first security certificate is a factory-installed certificate, and wherein the second security certificate is an operational certificate containing security information specific to the operator core network, the security information not present on the radio access device prior to issuance of the second security certificate.

21. A method, comprising:
receiving, at a security gateway situated between a radio access device and an operator core network, a first request for a first encrypted tunnel using a first certificate from a radio access device;
validating the first certificate using identifying information of the radio access device in the first certificate;
granting permission, at the security gateway, for the radio access device to obtain a second security certificate providing access to the operator core network;
requesting, at the security gateway, on behalf of the radio access device, the second security certificate from a second security gateway in the operator core network;
sending, at the security gateway, the second security certificate to the radio access device using the first encrypted tunnel; and
tearing down the first encrypted tunnel.

* * * * *